United States Patent
Okumura et al.

(10) Patent No.: US 10,461,625 B2
(45) Date of Patent: Oct. 29, 2019

(54) POWER CONVERSION DEVICE AND CONTROL METHOD FOR SAME

(71) Applicant: Sumitomo Electric Industries, Ltd., Osaka-shi (JP)

(72) Inventors: Toshiaki Okumura, Osaka (JP); Naoki Ayai, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 80 days.

(21) Appl. No.: 15/759,595

(22) PCT Filed: Aug. 19, 2016

(86) PCT No.: PCT/JP2016/074247
§ 371 (c)(1),
(2) Date: Mar. 13, 2018

(87) PCT Pub. No.: WO2017/061177
PCT Pub. Date: Apr. 13, 2017

(65) Prior Publication Data
US 2019/0044428 A1    Feb. 7, 2019

(30) Foreign Application Priority Data

Oct. 7, 2015   (JP) .................................. 2015-199521

(51) Int. Cl.
*H02J 1/10*   (2006.01)
*H02J 3/38*   (2006.01)
(Continued)

(52) U.S. Cl.
CPC ................. *H02M 1/08* (2013.01); *H02J 3/32* (2013.01); *H02J 3/383* (2013.01); *H02J 3/385* (2013.01);
(Continued)

(58) Field of Classification Search
CPC .... H02J 3/32; H02J 3/383; H02J 3/385; H02J 7/35; H02M 1/08; H02M 1/44;
(Continued)

(56) References Cited

U.S. PATENT DOCUMENTS

| 2010/0156189 A1* | 6/2010 | Fishman | H02J 3/36 |
| | | | 307/77 |
| 2013/0027997 A1* | 1/2013 | Tan | G05F 1/67 |
| | | | 363/95 |

(Continued)

FOREIGN PATENT DOCUMENTS

| WO | 2014/199795 A1 | 12/2014 |
| WO | 2014/199796 A1 | 12/2014 |

*Primary Examiner* — Rexford N Barnie
*Assistant Examiner* — Toan T Vu
(74) *Attorney, Agent, or Firm* — Baker Botts L.L.P.; Michael A. Sartori

(57) ABSTRACT

A control unit of a power conversion device calculates a current target value and a voltage target value for a DC/AC converter on the basis of an output current target value, to control the DC/AC converter, and calculates a current target value for the DC/DC converter on the basis of the current target value and the voltage target value, and a voltage target value for the DC/DC converter, to control the DC/DC converter, thereby controlling output of an AC power. The control unit selects, as the voltage target value for the DC/DC converter, a greatest value at a present time, from among a DC voltage value of the DC power supply, an absolute value of a voltage target value for an AC side of the DC/AC converter, and a DC voltage lower limit value which is a predetermined value smaller than a peak value of the absolute value.

8 Claims, 27 Drawing Sheets

(51) Int. Cl.

| | | |
|---|---|---|
| *H02M 1/08* | (2006.01) | |
| *H02S 40/32* | (2014.01) | |
| *H02M 1/44* | (2007.01) | |
| *H02M 3/156* | (2006.01) | |
| *H02M 7/5387* | (2007.01) | |
| *H02M 3/158* | (2006.01) | |
| *H02J 3/32* | (2006.01) | |
| *H02J 7/35* | (2006.01) | |
| *G05F 1/67* | (2006.01) | |
| *H02M 1/00* | (2006.01) | |
| *H02M 7/48* | (2007.01) | |

(52) U.S. Cl.
CPC ................ *H02J 7/35* (2013.01); *H02M 1/44* (2013.01); *H02M 3/156* (2013.01); *H02M 3/1584* (2013.01); *H02M 7/53871* (2013.01); *H02S 40/32* (2014.12); *G05F 1/67* (2013.01); *H02M 7/4826* (2013.01); *H02M 2001/007* (2013.01); *H02M 2001/0048* (2013.01)

(58) Field of Classification Search
CPC ................ H02M 3/156; H02M 3/1584; H02M 7/53871; H02M 2001/0048; H02M 2001/007; H02M 7/4826; H02S 40/32; G05F 1/67
USPC ............ 307/52; 363/17, 37, 41, 49, 91, 127, 363/131; 323/234, 259
See application file for complete search history.

(56) References Cited

U.S. PATENT DOCUMENTS

| | | | |
|---|---|---|---|
| 2014/0307494 A1* | 10/2014 | Wu | H02M 7/48 363/97 |
| 2015/0103573 A1* | 4/2015 | Zhu | H02M 1/36 363/131 |
| 2015/0270787 A1* | 9/2015 | Fujisaki | H02M 1/08 363/41 |
| 2015/0370278 A1* | 12/2015 | Li | G05F 1/67 323/234 |
| 2016/0126742 A1 | 5/2016 | Ayai et al. | |
| 2016/0126863 A1 | 5/2016 | Ayai et al. | |

* cited by examiner

POWER CONVERSION DEVICE AND CONTROL METHOD FOR SAME

TECHNICAL FIELD

The present invention relates to a power conversion device and a control method therefor.

This application claims priority on Japanese Patent Application No. 2015-199521 filed on Oct. 7, 2015, the entire contents of which are incorporated herein by reference.

BACKGROUND ART

For example, a power conversion device used as a power conditioner for photovoltaic generation converts a DC generated power to an AC power, to perform power interconnection to a commercial power grid. In a traditional power conversion device, a boost converter steps up a generated voltage to a certain voltage higher than a peak voltage on the AC side, and then an inverter circuit converts the voltage to an AC voltage. In this case, the boost converter and the inverter circuit always perform high-speed switching operations. Meanwhile, in such a power conversion device, it is important to improve the conversion efficiency. Accordingly, the following control is proposed: while the voltage on the DC side and the instantaneous voltage on the AC side are always compared with each other, the boost converter is caused to perform switching operation only during a period in which step-up operation is needed, and the inverter circuit is caused to perform switching operation only during a step-down operation is needed (see, for example, Patent Literature 1, 2). If the period in which the switching operation is stopped is provided to the boost converter and the inverter circuit owing to the above control, switching loss and the like are reduced by the amounts corresponding to the stop period, leading to improvement in the conversion efficiency.

CITATION LIST

Patent Literature

PATENT LITERATURE 1: International Publication No. 2014/199796
PATENT LITERATURE 2: International Publication No. 2014/199795

SUMMARY OF INVENTION

The present invention is a power conversion device provided between an AC grid and a DC power supply which outputs a voltage lower than a peak value of an absolute value of an AC voltage of the AC grid, the power conversion device being configured to perform DC/AC power conversion, the power conversion device including: a filter circuit connected to the AC grid; a DC/DC converter provided between the DC power supply and a DC bus; a capacitor connected to the DC bus; a DC/AC converter provided between the DC bus and the filter circuit; and a control unit configured to control the DC/DC converter and the DC/AC converter. The control unit calculates an output current target value on the basis of an input power value of a DC power and a voltage value of the AC grid, and calculates a current target value and a voltage target value for the DC/AC converter on the basis of the output current target value, to control the DC/AC converter, and calculates a current target value for the DC/DC converter on the basis of the current target value and the voltage target value for the DC/AC converter and a voltage target value for the DC/DC converter, to control the DC/DC converter, thereby controlling output of an AC power. The control unit selects, as the voltage target value for the DC/DC converter, a greatest value at a present time, from among a DC voltage value of the DC power supply, an absolute value of a voltage target value for an AC side of the DC/AC converter, and a DC voltage lower limit value which is a predetermined value smaller than a peak value of the absolute value.

Another aspect of the present invention is a control method executed by a power conversion device provided between an AC grid and a DC power supply which outputs a voltage lower than a peak value of an absolute value of an AC voltage of the AC grid, the power conversion device including: a filter circuit connected to the AC grid; a DC/DC converter provided between the DC power supply and a DC bus; a capacitor connected to the DC bus; and a DC/AC converter provided between the DC bus and the filter circuit, the power conversion device being configured to perform DC/AC power conversion, the method including: as a basic control method, calculating an output current target value on the basis of an input power value of a DC power and a voltage value of the AC grid, and calculating a current target value and a voltage target value for the DC/AC converter on the basis of the output current target value, to control the DC/AC converter, and calculating a current target value for the DC/DC converter on the basis of the current target value and the voltage target value for the DC/AC converter and a voltage target value for the DC/DC converter, to control the DC/DC converter, thereby controlling output of an AC power; and as an extensional control method, selecting, as the voltage target value for the DC/DC converter, a greatest value at a present time, from among a DC voltage value of the DC power supply, an absolute value of a voltage target value for an AC side of the DC/AC converter, and a DC voltage lower limit value which is a predetermined value smaller than a peak value of the absolute value.

BRIEF DESCRIPTION OF DRAWINGS

FIG. 9A, FIG. 9B, and FIG. 9C are schematic diagrams showing how to calculate a boost converter voltage target value Vo*, in which
FIG. 9A shows comparison between the inverter output voltage target value Vinv* and the first DC input voltage detection value Vg.1,
FIG. 9B shows a waveform of the boost converter voltage target value Vo*,
and FIG. 9C shows a case of stepping up the voltage of a power outputted from the second boost converter, using a second DC input voltage detection value Vg.2 as a reference.

DESCRIPTION OF EMBODIMENTS

Figure 1:
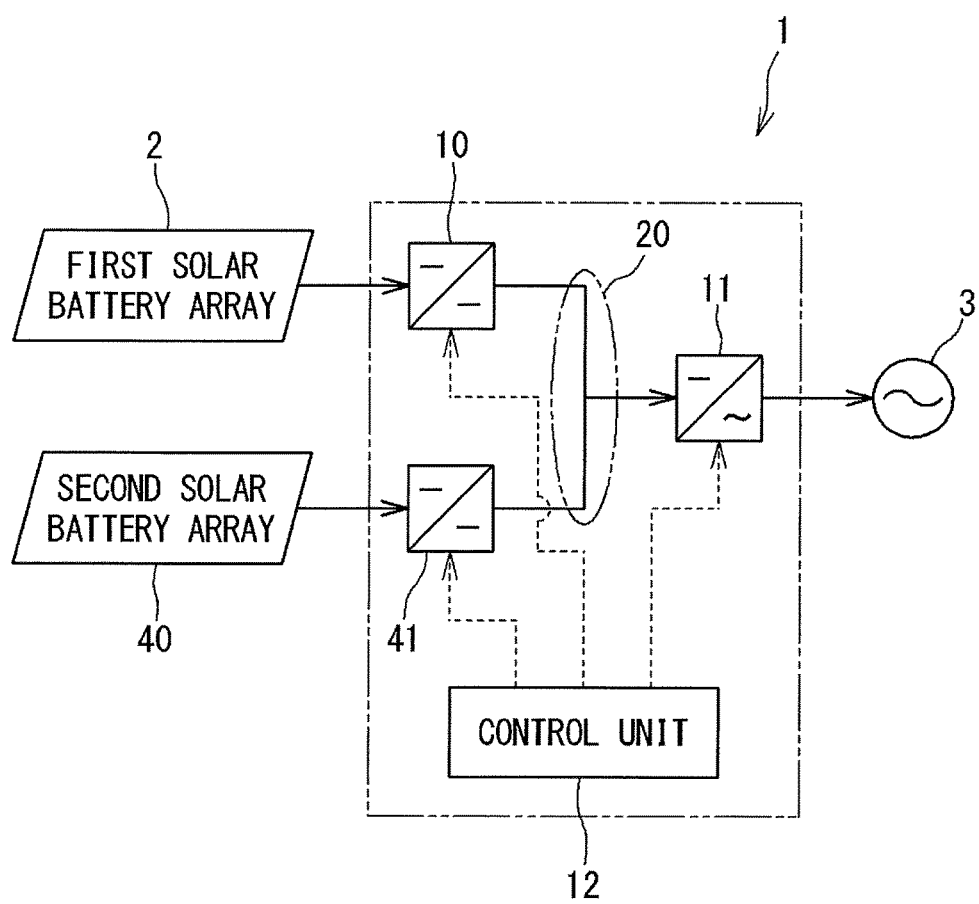
FIG. 1 is a block diagram showing an example of a system including an inverter device according to one embodiment.

Problems to be Solved by the Present Disclosure

For example, in a case of photovoltaic generation, the low-to-high range of a voltage inputted to the power conversion device is wide, and a DC voltage considerably lower than the effective value of the AC voltage may be inputted. If the above control is applied to such a low voltage, it has been found that a great reactive power occurs due to a smoothing capacitor connected to a DC bus connecting the boost converter and the inverter circuit, and this more or less influences the control accuracy.

In view of the above problem, an object of the present disclosure is to, in a power conversion device that basically performs control having a stop period of switching operation, suppress reduction in control accuracy even when a DC voltage considerably lower than the effective value of the AC voltage is inputted.

Effects of the Present Disclosure

According to the present disclosure, in a power conversion device that basically performs control having a stop period of switching operation, it is possible to suppress reduction in control accuracy even when a DC voltage considerably lower than the effective value of the AC voltage is inputted.

Summary of Embodiments

Summary of the embodiments of the present invention includes at least the following.

(1) This is a power conversion device provided between an AC grid and a DC power supply which outputs a voltage lower than a peak value of an absolute value of an AC voltage of the AC grid, the power conversion device being configured to perform DC/AC power conversion, the power conversion device including: a filter circuit connected to the AC grid; a DC/DC converter provided between the DC power supply and a DC bus; a capacitor connected to the DC bus; a DC/AC converter provided between the DC bus and the filter circuit; and a control unit configured to control the DC/DC converter and the DC/AC converter. The control unit calculates an output current target value on the basis of an input power value of a DC power and a voltage value of the AC grid, and calculates a current target value and a voltage target value for the DC/AC converter on the basis of the output current target value, to control the DC/AC converter, and calculates a current target value for the DC/DC converter on the basis of the current target value and the voltage target value for the DC/AC converter and a voltage target value for the DC/DC converter, to control the DC/DC converter, thereby controlling output of an AC power. The control unit selects, as the voltage target value for the DC/DC converter, a greatest value at a present time, from among a DC voltage value of the DC power supply, an absolute value of a voltage target value for an AC side of the DC/AC converter, and a DC voltage lower limit value which is a predetermined value smaller than a peak value of the absolute value.

In the power conversion device configured as described above, when the DC voltage value of the DC power supply is greater than the DC voltage lower limit value, the greater one of the DC voltage value of the DC power supply and the absolute value of the voltage target value for the AC side of the DC/AC converter is used as the voltage target value for the DC/DC converter at that time. In this case, the DC/DC converter and the DC/AC converter both have switching stop periods in the AC cycle. On the other hand, when the DC voltage value of the DC power supply is smaller than the DC voltage lower limit value, the greater one of the DC voltage lower limit value and the absolute value of the voltage target value for the AC side of the DC/AC converter is used as the voltage target value for the DC/DC converter at that time. Therefore, the voltage target value for the DC/DC converter has a waveform obtained by selecting the greater one of the DC voltage lower limit value and the absolute value of the voltage target value for the AC side of the DC/AC converter. This means that, when the DC voltage is too low as compared to the peak value of the AC voltage, the DC/DC converter is not stopped but is caused to perform step-up operation to raise the voltage to the DC voltage lower limit value. Thus, the reactive power due to change in voltage between both ends of the capacitor connected to the DC bus can be reduced. As a result, the active-current control which is originally desired to be performed can be more accurately performed. Therefore, in the power conversion device that basically performs control having a stop period of switching operation, it is possible to suppress reduction in control accuracy even when a DC voltage considerably lower than the effective value of the AC voltage is inputted.

(2) In the power conversion device of (1), for example, the DC power supply and the DC/DC converter comprise plural pairs of DC power supplies and DC/DC converters, so that there are a plurality of DC voltage values of the DC power supplies, and a greatest value of the plurality of DC voltage values is to be compared with the DC voltage lower limit value.

In this case, the reactive power is shared among the plurality of DC/DC converters, whereby the reactive power per DC/DC converter can be reduced.

(3) In the power conversion device of (1) or (2), for example, the DC voltage lower limit value is selected so as to shorten a period during which a reactive power occurs, and prolong a period during which the reactive power is zero.

In this case, even though the peak value of the reactive power cannot be reduced, the reactive power can be reduced owing to the period during which the reactive power is zero, and therefore the active-power control is facilitated.

(4) In the power conversion device of (3), for example, the DC voltage lower limit value is selected so that the period during which the reactive power occurs becomes equal to or shorter than half an AC ($\frac{1}{2}$) cycle.

In this case, it is ensured that the period during which the reactive power is zero is equal to or longer than half the AC ($\frac{1}{2}$) cycle. Therefore, the effect of suppressing the reactive power is well exerted.

(5) A method aspect is a control method executed by a power conversion device provided between an AC grid and a DC power supply which outputs a voltage lower than a peak value of an absolute value of an AC voltage of the AC grid, the power conversion device including: a filter circuit connected to the AC grid; a DC/DC converter provided between the DC power supply and a DC bus; a capacitor connected to the DC bus; and a DC/AC converter provided between the DC bus and the filter circuit, the power conversion device being configured to perform DC/AC power conversion, the method including: as a basic control method, calculating an output current target value on the basis of an input power value of a DC power and a voltage value of the AC grid, and calculating a current target value and a voltage target value for the DC/AC converter on the basis of the output current target value, to control the DC/AC converter, and calculating a current target value for the DC/DC converter on the basis of the current target value and the voltage target value for the DC/AC converter and a voltage target value for the DC/DC converter, to control the DC/DC converter, thereby controlling output of an AC power; and as an extensional control method, selecting, as the voltage target value for the DC/DC converter, a greatest value at a present time, from among a DC voltage value of the DC power supply, an absolute value of a voltage target value for an AC side of the DC/AC converter, and a DC voltage lower limit value which is a predetermined value smaller than a peak value of the absolute value.

In the control method of (5), when the DC voltage value of the DC power supply is greater than the DC voltage lower limit value, the greater one of the DC voltage value of the DC power supply and the absolute value of the voltage target value for the AC side of the DC/AC converter is used as the voltage target value for the DC/DC converter at that time. In this case, the DC/DC converter and the DC/AC converter both have switching stop periods in the AC cycle. On the other hand, when the DC voltage value of the DC power supply is smaller than the DC voltage lower limit value, the greater one of the DC voltage lower limit value and the absolute value of the voltage target value for the AC side of the DC/AC converter is used as the voltage target value for the DC/DC converter at that time. Therefore, the voltage target value for the DC/DC converter has a waveform obtained by selecting the greater one of the DC voltage lower limit value and the absolute value of the voltage target value for the AC side of the DC/AC converter. This means that, when the DC voltage is too low as compared to the peak value of the AC voltage, the DC/DC converter is not stopped but is caused to perform step-up operation to raise the voltage to the DC voltage lower limit value. Thus, the reactive power due to change in voltage between both ends of the capacitor connected to the DC bus can be reduced. As a result, the active-current control which is originally desired to be performed can be more accurately performed. Therefore, in the power conversion device that basically performs control having a stop period of switching operation, it is possible to suppress reduction in control accuracy even when a DC voltage considerably lower than the effective value of the AC voltage is inputted.

It is noted that, instead of the expressions of (1) and (4), the power conversion device can also be expressed as follows.

The power conversion device is a power conversion device provided between an AC grid and a DC power supply which outputs a voltage lower than a peak value of an absolute value of an AC voltage of the AC grid, the power conversion device being configured to perform DC/AC power conversion, the power conversion device including: a filter circuit connected to the AC grid; a DC/DC converter provided between the DC power supply and a DC bus; a capacitor connected to the DC bus; a DC/AC converter provided between the DC bus and the filter circuit; and a control unit configured to control the DC/DC converter and the DC/AC converter. The control unit calculates an output current target value on the basis of an input power value of a DC power and a voltage value of the AC grid, and calculates a current target value and a voltage target value for the DC/AC converter on the basis of the output current target value, to control the DC/AC converter, and calculates a current target value for the DC/DC converter on the basis of the current target value and the voltage target value for the DC/AC converter and a voltage target value for the DC/DC converter, to control the DC/DC converter, thereby controlling output of an AC power. The control unit selects, as the voltage target value for the DC/DC converter, a greatest value at a present time, from among a DC voltage value of the DC power supply, an absolute value of a voltage target value for an AC side of the DC/AC converter, and a DC voltage lower limit value which is a predetermined value smaller than a peak value of the absolute value, and the control unit causes a period during which a part of a pulsating current waveform of the absolute value appears, to be equal to or shorter than half of one pulsating current cycle.

Details of Embodiments

Hereinafter, embodiments of the present invention will be described with reference to the drawings.

<<1 Overall Configuration>>

FIG. 1 is a block diagram showing an example of a system including an inverter device according to one embodiment. In FIG. 1, a first solar battery array 2 and a second solar battery array 40 as DC power supplies are connected to an input end of an inverter device 1, and an AC commercial power grid 3 is connected to an output end of the inverter device 1.

This system performs interconnection operation to convert a DC power generated by the first solar battery array 2 (hereinafter, may be simply referred to as a first array 2) and the second solar battery array 40 (hereinafter, may be simply referred to as a second array 40), to an AC power, and output the AC power to the commercial power grid 3.

The first array 2 and the second array 40 are each composed of a plurality of photovoltaic panels (modules) connected in series and parallel. In the present embodiment, the second array 40 is configured such that the voltage of a power outputted from the second array 40 is smaller than the voltage of a power outputted from the first array 2.

The inverter device 1 includes a first boost converter 10 which receives a DC power outputted from the first array 2, a second boost converter 41 which receives a DC power outputted from the second array 40, an inverter circuit 11 which converts powers outputted from both boost converters 10 and 41 to a DC bus 20, to an AC power and outputs the AC power to the commercial power grid 3, and a control unit 12 which controls operations of these circuits 10, 11, and 42.

The first boost converter 10 and the second boost converter 41 are connected in parallel to the inverter circuit 11.

Figure 2:
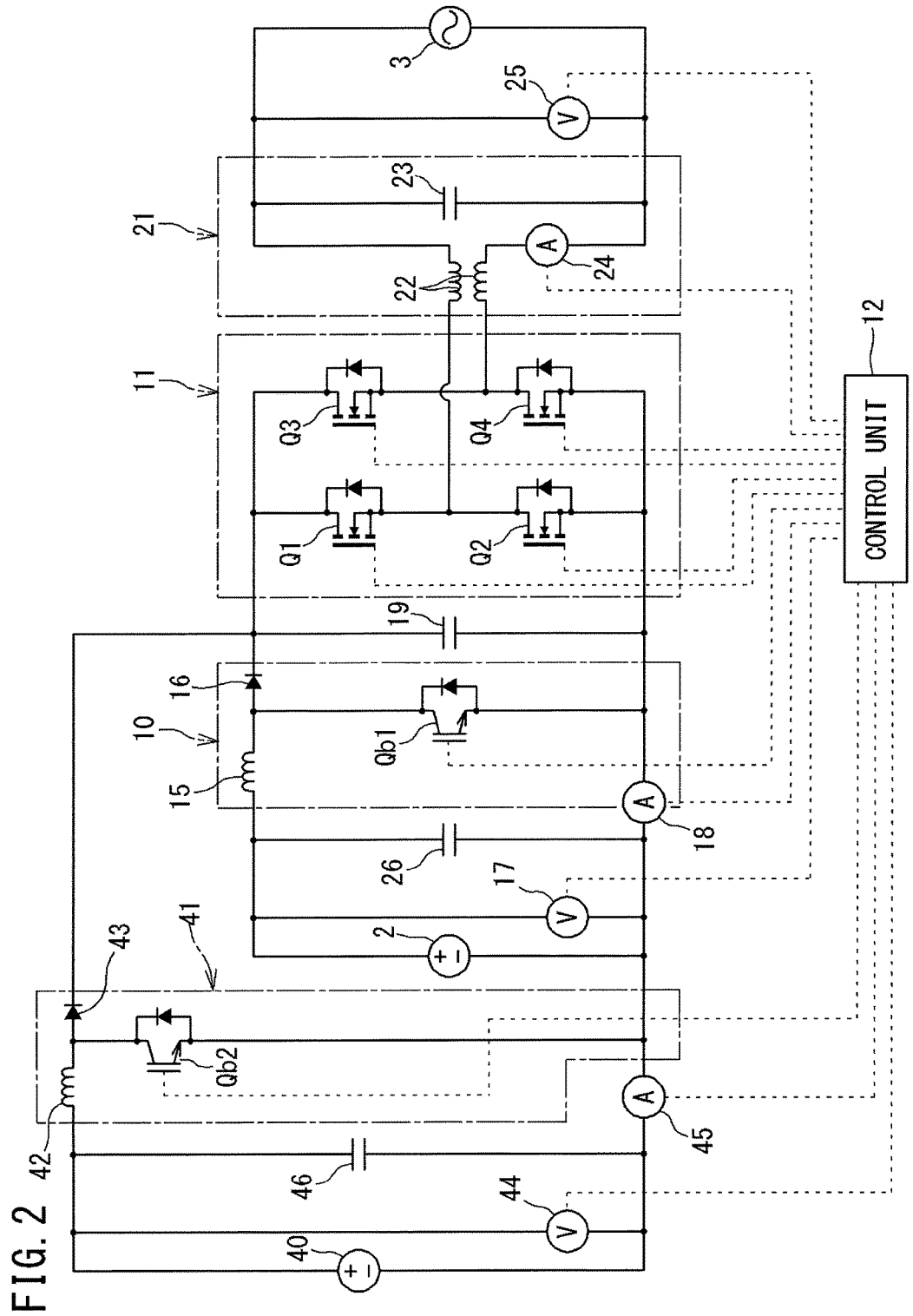
FIG. 2 shows an example of a circuit diagram of the inverter device.

FIG. 2 shows an example of a circuit diagram of the inverter device 1.

The first boost converter 10 to which the first array 2 is connected includes a DC reactor 15, a diode 16, and a switching element Qb1 composed of an Insulated Gate Bipolar Transistor (IGBT) or the like, to form a step-up chopper circuit. It is noted that the diode 16 may be replaced with a switching element.

On an input side of the first boost converter 10, a first voltage sensor 17, a first current sensor 18, and a capacitor 26 for smoothing are provided. The first voltage sensor 17 detects a first DC input voltage detection value Vg.1 (DC input voltage value) of a DC power outputted from the first array 2 and then inputted to the first boost converter 10, and outputs the first DC input voltage detection value Vg.1 to the control unit 12. The first current sensor 18 detects a first boost converter current detection value Iin.1 of a current flowing through the DC reactor 15, and outputs the first boost converter current detection value Iin.1 to the control unit 12.

The second boost converter 41 to which the second array 40 is connected includes a DC reactor 42, a diode 43, and a switching element Qb2 composed of an IGBT or the like, to form a step-up chopper circuit as in the first boost converter. It is noted that the diode 43 may be replaced with a switching element.

On an input side of the second boost converter 41, a second voltage sensor 44, a second current sensor 45, and a capacitor 46 for smoothing are provided. The second voltage sensor 44 detects a second DC input voltage detection value Vg.2 of a DC power outputted from the second array 40 and then inputted to the second boost converter 41, and outputs the second DC input voltage detection value Vg.2 to the control unit 12. The second current sensor 45 detects a second boost converter current detection value Iin.2 of a current flowing through the DC reactor 42, and outputs the second boost converter current detection value Iin.2 to the control unit 12.

The control unit 12 has a function of calculating input powers Pin.1 and Pin.2 from the DC input voltage detection values Vg.1 and Vg.2 and the boost converter current detection values Iin.1 and Iin.2 and performing maximum power point tracking (MPPT) control for the first array 2 and the second array 40.

The switching element Qb1 of the first boost converter 10 is controlled by the control unit 12 so that a period in which switching operation is performed is alternately switched between the first boost converter 10 and the inverter circuit 11 as described later. Therefore, during a period in which switching operation is performed in the first boost converter 10, the first boost converter 10 outputs the stepped-up power to the inverter circuit 11, and during a period in which the switching operation is stopped, the first boost converter 10 outputs, to the inverter circuit 11, the DC power outputted from the first array 2 and then inputted to the first boost converter 10, without stepping up the DC power.

Further, as described later, the second boost converter 41 is controlled by the control unit 12 so as to, during a predetermined period, step up a voltage value of the DC power given from the second array 40, to a value that substantially coincides with the first DC input voltage detection value Vg.1 which is the voltage value of the DC power given from the first array 2, and output the stepped-up power.

A capacitor 19 for smoothing is connected between the boost converters 10 and 41 and the inverter circuit 11.

The inverter circuit 11 includes switching elements Q1 to Q4 each composed of a Field Effect Transistor (FET). The switching elements Q1 to Q4 form a full-bridge circuit.

The switching elements Q1 to Q4 are connected to the control unit 12, and can be controlled by the control unit 12. The control unit 12 performs PWM control of operations of the switching elements Q1 to Q4. Thereby, the inverter circuit 11 converts the power given from each of the boost converters 10 and 41 to an AC power.

The inverter device 1 includes a filter circuit 21 between the inverter circuit 11 and the commercial power grid 3.

The filter circuit 21 is composed of two AC reactors 22 and a capacitor 23. The filter circuit 21 has a function to remove a high-frequency component contained in the AC power outputted from the inverter circuit 11. The AC power from which the high-frequency component has been removed by the filter circuit 21 is given to the commercial power grid 3.

A third current sensor 24 for detecting an inverter current detection value Iinv (current flowing through the AC reactor 22) which is a current value of output of the inverter circuit 11 is connected to the filter circuit 21. A third voltage sensor 25 for detecting a voltage value (grid voltage detection value Va) on the commercial power grid 3 side is connected between the filter circuit 21 and the commercial power grid 3.

The third current sensor 24 and the third voltage sensor 25 respectively output the detected inverter current detection value Iinv and the detected grid voltage detection value Va to the control unit 12.

The control unit 12 controls the boost converters 10 and 41 and the inverter circuit 11 based on the grid voltage detection value Va, the inverter current detection value Iinv, the DC input voltage detection values Vg.1 and Vg.2, and the boost converter current detection values Iin.1 and Iin.2.

<<2 Control Unit>>

Figure 3:
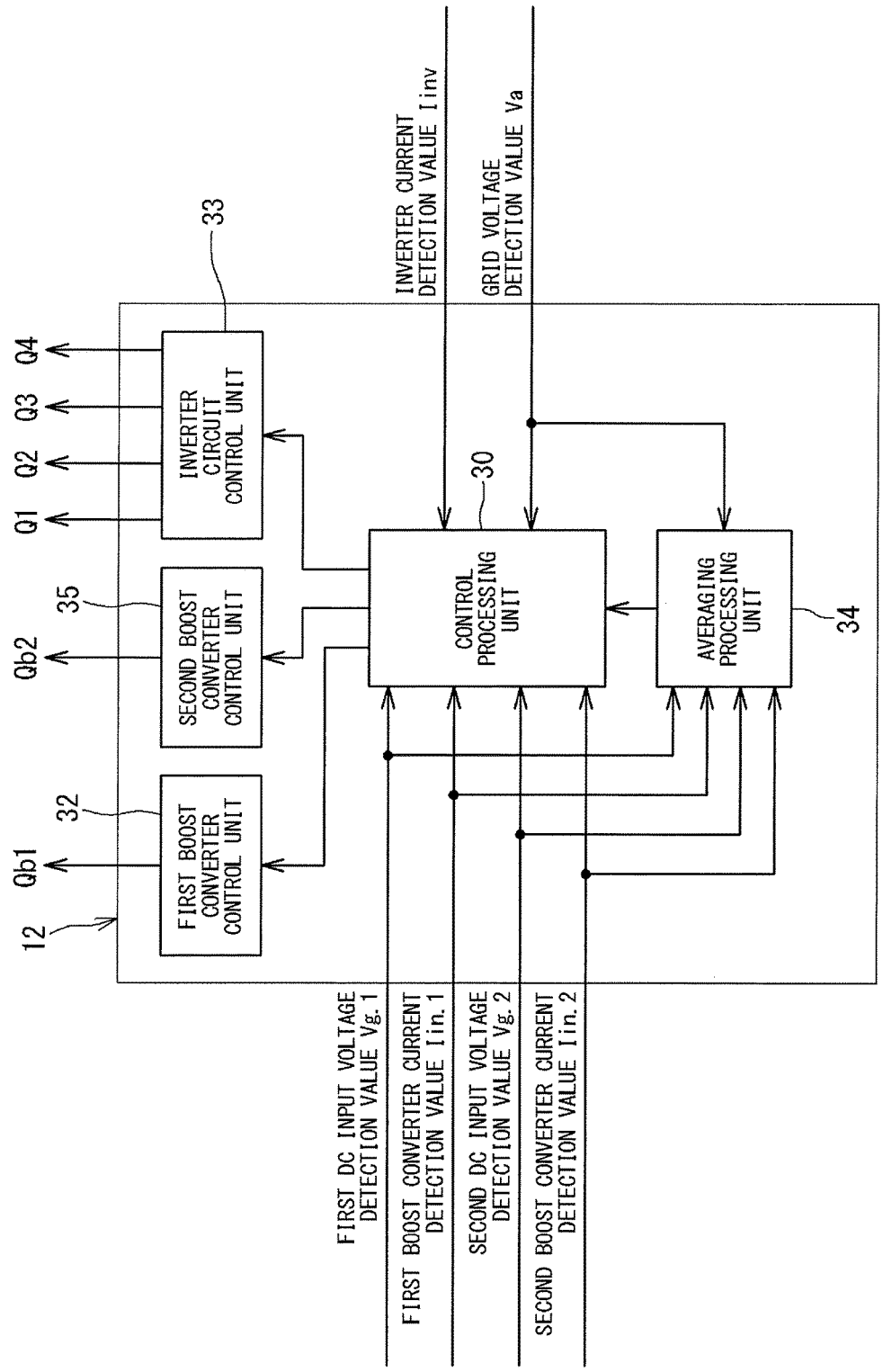
FIG. 3 is a block diagram of a control unit.

FIG. 3 is a block diagram of the control unit 12. As shown in FIG. 3, the control unit 12 functionally has a control processing unit 30, a first boost converter control unit 32, an inverter circuit control unit 33, an averaging processing unit 34, and a second boost converter control unit 35.

Some or all of the functions of the control unit 12 may be configured as a hardware circuit, or may be realized by software (computer program) executed by a computer. Such software (computer program) for realizing a function of the control unit 12 is stored in a storage device (not shown) of the computer.

The first boost converter control unit 32 controls the switching element Qb1 of the first boost converter 10 based on a target value and a detection value given from the control processing unit 30, thereby causing the first boost converter 10 to output a power having a current corresponding to the target value.

The second boost converter control unit 35 controls the switching element Qb2 of the second boost converter 41 based on a target value and a detection value given from the control processing unit 30, thereby causing the second boost converter 41 to output a power having a current corresponding to the target value.

The inverter circuit control unit 33 controls the switching elements Q1 to Q4 of the inverter circuit 11 based on a target value and a detection value given from the control processing unit 30, thereby causing the inverter circuit 11 to output a power having a current corresponding to the target value.

The control processing unit 30 receives the DC input voltage detection values Vg.1 and Vg.2, the boost converter current detection values Iin.1 and Iin.2, the grid voltage detection value Va, and the inverter current detection value Iinv.

The control processing unit 30 calculates the first input power Pin.1 of the first boost converter 10 and an average value <Pin.1> thereof, and the second input power Pin.2 of the second boost converter 41 and an average value <Pin.2> thereof, from the DC input voltage detection values Vg.1 and Vg.2 and the boost converter current detection values Iin.1 and Iin.2.

The control processing unit 30 has a function to set a first DC input current target value Ig.1* (which will be described later) of the first boost converter 10 based on the first input power average value <Pin.1>, and to perform MPPT control for the first array 2 and perform feedback control for the first boost converter 10 and the inverter circuit 11.

The control processing unit 30 also has a function to set a DC input current target value Ig.2* (which will be described later) of the second boost converter 41 based on the second input power average value <Pin.2>, and to perform MPPT control for the second array 40 and perform feedback control for the second boost converter 41.

The DC input voltage detection values Vg.1 and Vg.2 and the boost converter current detection values Iin.1 and Iin.2 are given to the averaging processing unit 34 and the control processing unit 30.

The averaging processing unit 34 has a function to sample, at predetermined time intervals, the DC input voltage detection values Vg.1 and Vg.2 and the boost converter current detection values Iin.1 and Iin.2 given from both voltage sensors 17 and 44 and both current sensors 18 and 45, calculate their respective average values, and give the averaged DC input voltage detection values Vg.1 and Vg.2 and the averaged boost converter current detection values Iin.1 and Iin.2 to the control processing unit 30.

Figure 4:
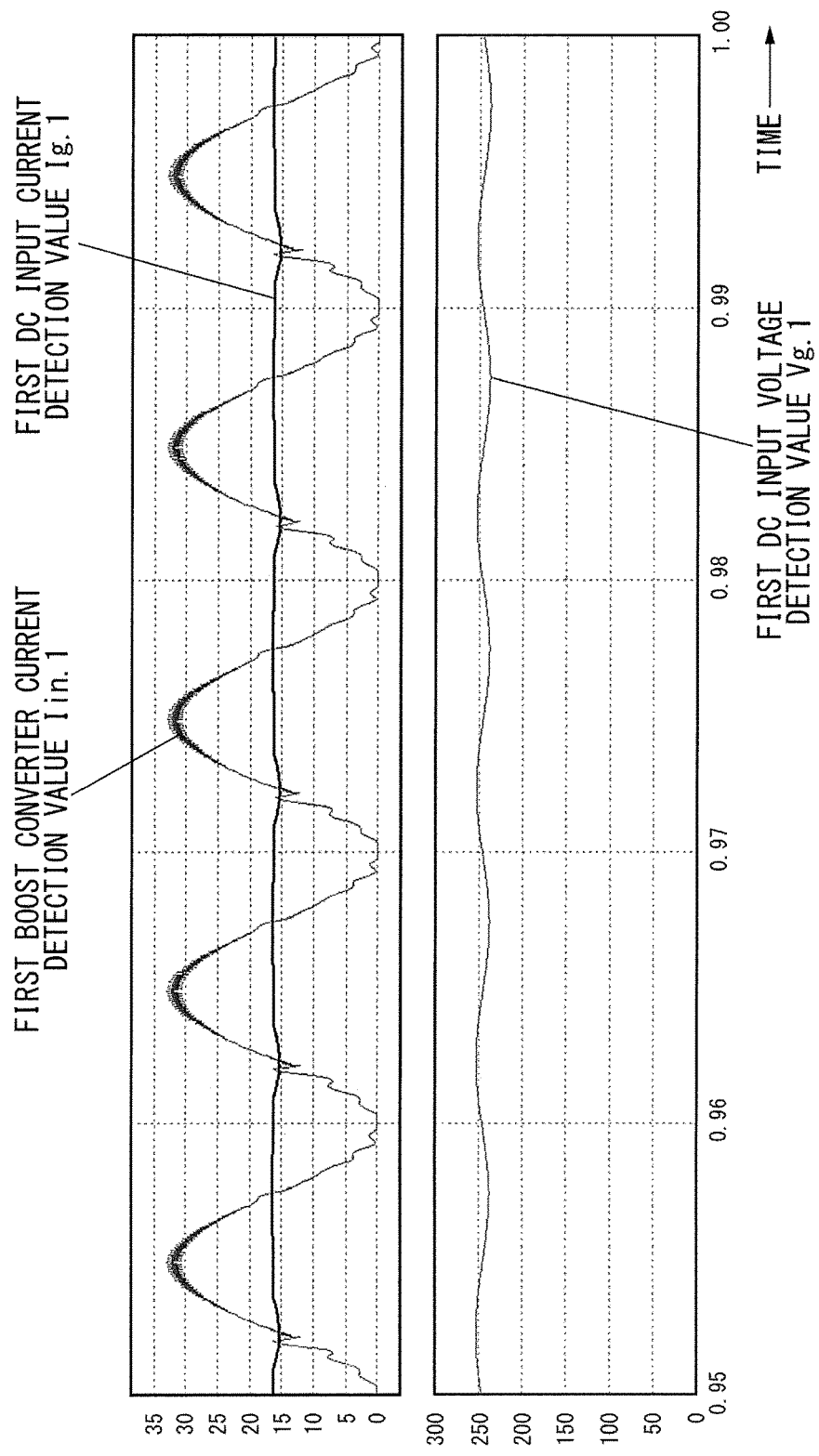
FIG. 4 is a graph showing an example of a simulation result of temporal variations in a first DC input voltage detection value Vg.1 (vertical axis: [V]), a first boost converter current detection value Iin.1 (vertical axis: [A]), and a first DC input current detection value Ig.1 (vertical axis: [A]).

FIG. 4 is a graph showing an example of a simulation result of temporal variations in the first DC input voltage detection value Vg.1 and the first boost converter current detection value Iin.1.

The first boost converter current detection value Iin.1 appears as a waveform synchronized with the grid voltage, based on a target value, as described later.

The first DC input current detection value Ig.1 is a current value detected on an input side relative to the capacitor 26.

As shown in FIG. 4, it is found that the first DC input voltage detection value Vg.1 and the first DC input current detection value Ig.1 (first boost converter current detection value Iin.1) vary in a half cycle of the grid voltage.

The reason why the first DC input voltage detection value Vg.1 and the first DC input current detection value Ig.1 vary periodically as shown in FIG. 4 is as follows. That is, the first boost converter current detection value Iin.1 of the inverter device 1 greatly varies between almost 0 A and a peak value in a half cycle of the AC cycle in accordance with operations of the boost converter 10 and the inverter circuit 11. Therefore, the variation component cannot be fully removed by the capacitor 26, and the first DC input current detection value Ig.1 is detected as a pulsating current containing a component that varies in a half cycle of the AC cycle. On the other hand, the output voltage of the photovoltaic panel varies depending on the output current.

Therefore, the cycle of the periodic variation occurring in the first DC input voltage detection value Vg.1 is half the cycle of AC power outputted from the inverter device 1. That is, the cycle of the periodic variation is half the cycle of the commercial power grid 3.

The averaging processing unit 34 averages the first DC input voltage detection value Vg.1 and the first boost converter current detection value Iin.1 in order to suppress an influence of the above periodic variations.

Figure 5:
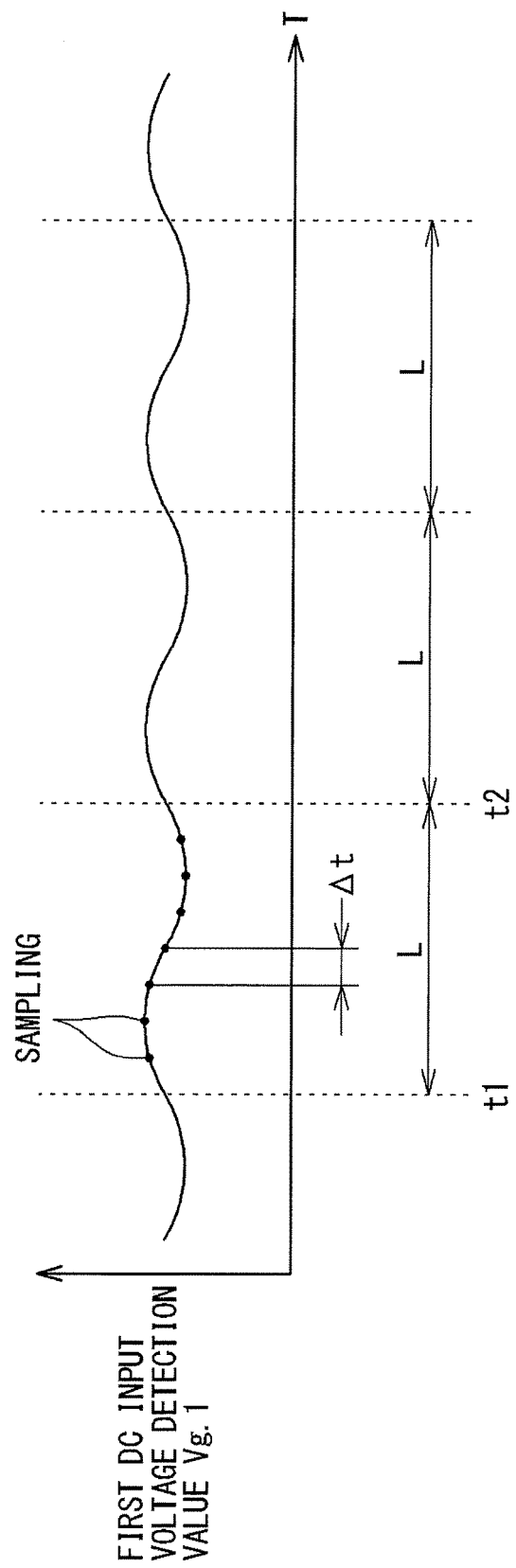
FIG. 5 is a diagram showing a manner in which an averaging processing unit averages the first DC input voltage detection value Vg.1.

FIG. 5 is a diagram showing a manner in which the averaging processing unit 34 averages the first DC input voltage detection value Vg.1.

The averaging processing unit 34 samples the given first DC input voltage detection value Vg.1 a plurality of times (at timings indicated by solid dots in FIG. 5) at predetermined time intervals Δt during a period L from a timing t1 to a timing t2, and calculates an average value of the plurality of first DC input voltage detection values Vg.1 that have been obtained.

Here, the averaging processing unit 34 sets the period L to half the length of the cycle of the commercial power grid 3. In addition, the averaging processing unit 34 sets the time interval Δt to be sufficiently shorter than half the length of the cycle of the commercial power grid 3.

Thus, the averaging processing unit 34 can accurately obtain the average value of the first DC input voltage detection value Vg.1 which periodically varies in a half cycle of the commercial power grid 3, using as short a sampling period as possible.

The time interval Δt of sampling may be set at, for example, 1/100 to 1/1000 of the cycle of the commercial power grid 3, or 20 microseconds to 200 microseconds.

The averaging processing unit 34 may store the period L in advance, or may acquire the grid voltage detection value Va from the third voltage sensor 25 and acquire information about the cycle of the commercial power grid 3.

Here, the period L is set to half the length of the cycle of the commercial power grid 3. The average value of the first DC input voltage detection value Vg.1 can be accurately calculated at least if the period L is set to half the cycle of the commercial power grid 3. This is because the first DC input voltage detection value Vg.1 periodically varies in a half cycle of the commercial power grid 3 in accordance with operations of the boost converter 10 and the inverter circuit 11 as described above.

Therefore, if it is required to set the period L to be longer, the period L may be set to an integer multiple of a half cycle of the commercial power grid 3, e.g., three or four times of a half cycle of the commercial power grid 3. Thus, the voltage variation can be grasped on a cycle basis.

As described above, the first boost converter current detection value Iin.1 also periodically varies in a half cycle of the commercial power grid 3, as in the first DC input voltage detection value Vg.1.

Therefore, the averaging processing unit 34 also calculates an average value of the first boost converter current detection value Iin.1 by the same method as in the first DC input voltage detection value Vg.1 shown in FIG. 5.

Further, the second DC input voltage detection value Vg.2 and the second boost converter current detection value Iin.2 on the second array 40 side also periodically vary in a half cycle of the commercial power grid 3, for the same reason as for the first DC input voltage detection value Vg.1.

Therefore, the averaging processing unit 34 also calculates average values of the second DC input voltage detection value Vg.2 and the second boost converter current detection value Iin.2 by the same method as for the first DC input voltage detection value Vg.1 shown in FIG. 5.

The control processing unit 30 sequentially calculates average values of the DC input voltage detection values Vg.1 and Vg.2 and average values of the boost converter current detection values Iin.1 and Iin.2 per period L.

The averaging processing unit 34 gives the calculated average values of the DC input voltage detection values Vg.1 and Vg.2 and the calculated average values of the boost converter current detection values Iin.1 and Iin.2 to the control processing unit 30.

In the present embodiment, as described above, the averaging processing unit 34 calculates average values of the DC input voltage detection values Vg.1 and Vg.2 and average values of the boost converter current detection values Iin1 and Iin2, and using these values, the control processing unit 30 controls both boost converters 10 and 41 and the inverter circuit 11 while performing MPPT control for both arrays 2 and 40. Therefore, even if DC currents from the both arrays 2 and 40 vary to be unstable, the control unit 12 can accurately obtain outputs of both arrays 2 and 40 as the average values of the DC input voltage detection values Vg.1 and Vg.2 and the average values of the boost converter current detection values Iin.1 and Iin.2. As a result, it becomes possible to appropriately perform MPPT control and effectively suppress reduction in power supply efficiency.

As described above, in a case where voltages (DC input voltage detection values Vg.1 and Vg.2) or currents (boost converter current detection values Iin.1 and Iin.2) of DC powers outputted from both arrays 2 and 40 vary due to variation in an input current to the inverter device 1, the cycle of the variation coincides with a half cycle (a half cycle of the commercial power grid 3) of AC power outputted from the inverter circuit 11.

In this regard, in the present embodiment, the DC input voltage detection values Vg.1 and Vg.2 and the boost converter current detection values Iin.1 and Iin.2 are each sampled a plurality of times at the time intervals Δt which are sufficiently shorter than a half cycle of the AC grid, during the period L which is set to half the length of the cycle of the commercial power grid 3, and the average values of the DC input voltage detection values Vg.1 and Vg.2 and the average values of the boost converter current detection values Iin.1 and Iin.2 are calculated from a result of the sampling. Therefore, even if the voltage and current of the DC current vary periodically, the DC input voltage detection values Vg.1 and Vg.2 and the boost converter current detection values Iin.1 and Iin.2 can be accurately calculated.

Such variations occurring in the DC input voltage detection values Vg.1 and Vg.2 and the boost converter current detection values Iin.1 and Iin.2 given from both arrays 2 and 40 are due to variation in impedance of the inverter circuit 11 or the like as described above. Therefore, the DC input voltage detection values Vg.1 and Vg.2 and the boost converter current detection values Iin.1 and Iin.2 may be obtained from a result of sampling performed a plurality of times at time intervals Δt which are shorter than a half cycle of the AC power outputted from the inverter circuit 11.

The control processing unit 30 sets the DC input current target values Ig.1* and Ig.2* based on the above input power average values <Pin.1> and <Pin.2>, and calculates target values for both boost converters 10 and 41 and the inverter circuit 11 based on the set DC input current target values Ig.1* and Ig.2* and the above values.

The control processing unit 30 has a function of giving the calculated target values to the first boost converter control unit 32, the second boost converter control unit 35, and the inverter circuit control unit 33 and performing feedback control for both boost converters 10 and 41 and the inverter circuit 11.

Figure 6:
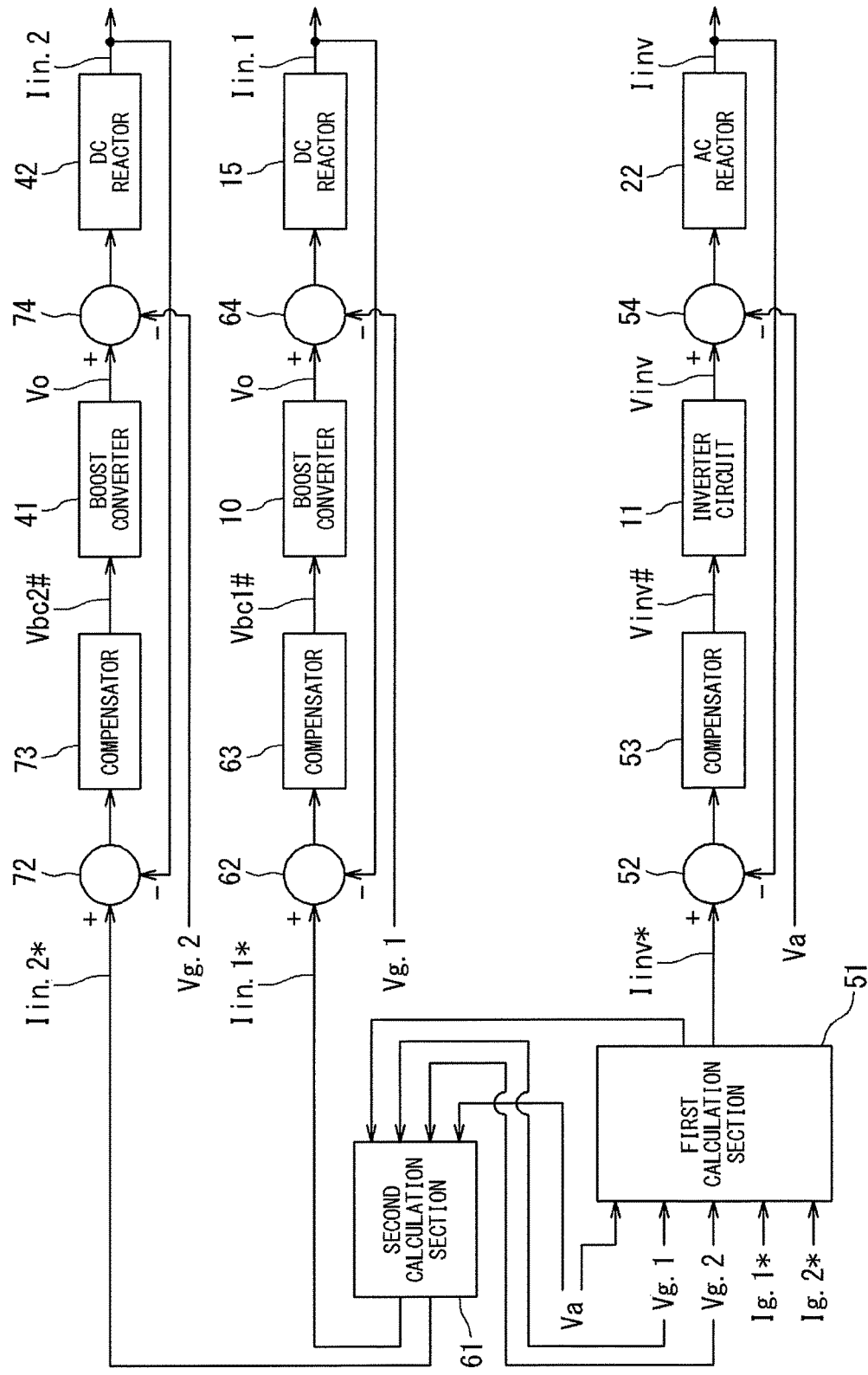
FIG. 6 is a control block diagram for explaining a control process by a control processing unit.

FIG. 6 is a control block diagram for explaining a control process by the control processing unit 30.

The control processing unit 30 includes, as function sections for controlling the inverter circuit 11, a first calculation section 51, a first adder 52, a compensator 53, and a second adder 54.

In addition, the control processing unit 30 includes, as function sections for controlling both boost converters 10 and 41, a second calculation section 61, a third adder 62, a compensator 63, a fourth adder 64, a fifth adder 72, a compensator 73, and a sixth adder 74.

Figure 7:
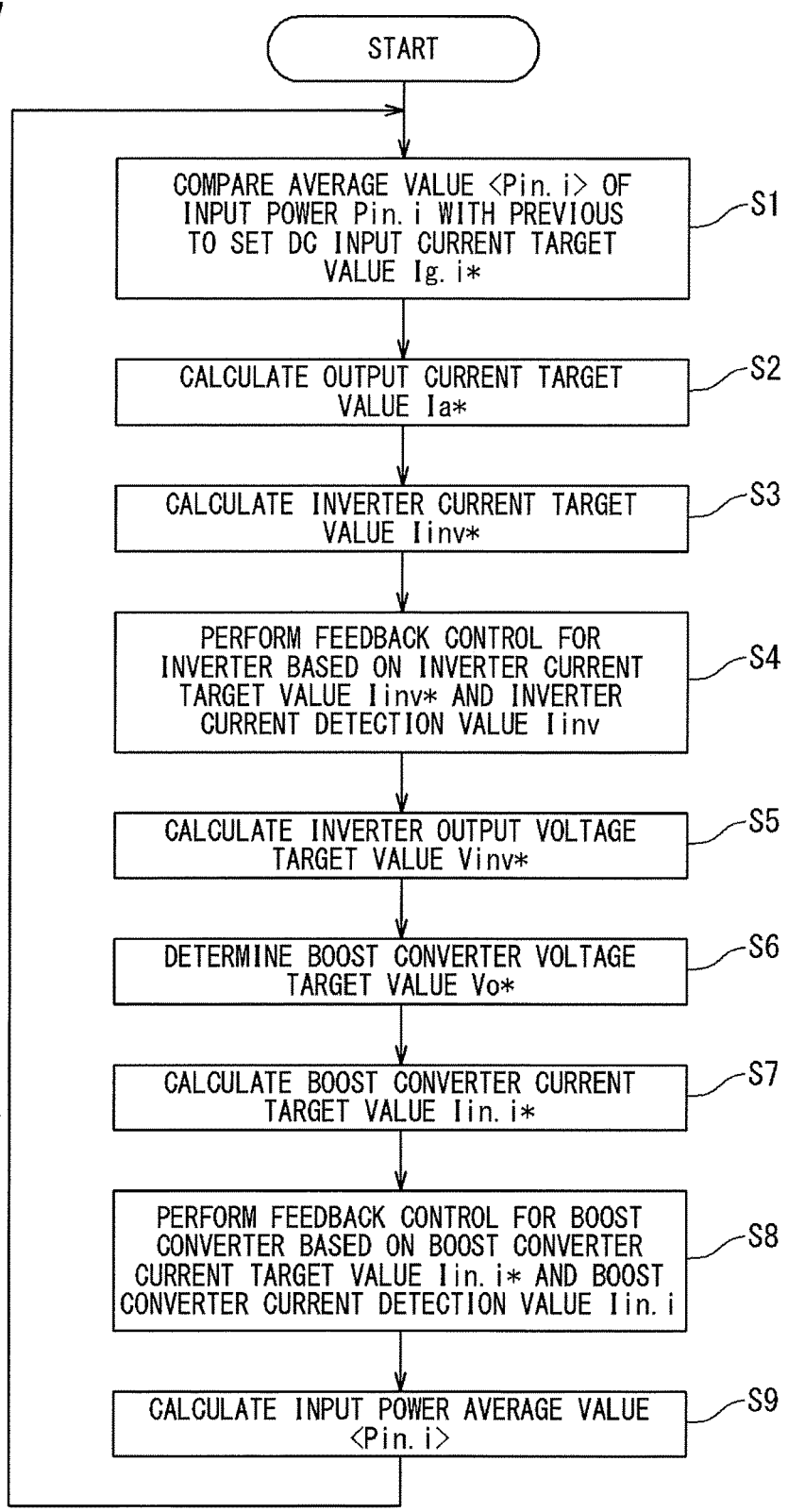
FIG. 7 is a flowchart showing a control process for both boost converters and an inverter circuit.

FIG. 7 is a flowchart showing a control process for both boost converters 10 and 41 and the inverter circuit 11. The function sections shown in FIG. 6 control both boost converters 10 and 41 and the inverter circuit 11 by executing the process shown in the flowchart in FIG. 7.

Hereinafter, the control process for both boost converters 10 and 41 and the inverter circuit 11 will be described with reference to FIG. 7.

First, the control processing unit 30 calculates the present input power average value <Pin.i> (step S9), and compares the present input power average value <Pin.i> with the input power average value <Pin.i> that has been previously calculated, to set a DC input current target value Ig.i* (step S1). The input power average value <Pin.i> is calculated based on the following expression (1).

$$\text{Input power average value } <Pin.i> = <Iin.i \times Vg.i> \tag{1}$$

In expression (1), "i" is a number corresponding to each boost converter connected to the inverter circuit 11, and is, in the present embodiment, "1" or "2". A case of "i=1" corresponds to the first boost converter 10, and a case of "i=2" corresponds to the second boost converter 41. Therefore, <Pin.1> indicates an input power average value of the first boost converter 10, and <Pin.2> indicates an input power average value of the second boost converter 41.

In the present embodiment, the control processing unit 30 calculates the input power average values <Pin.1> and <Pin.2>, and sets the DC input current target values Ig.1* and Ig.2*.

In expression (1), Iin.i is the boost converter current detection value, and Vg.i is the DC input voltage detection value, and the boost converter current detection value Iin.i and the DC input voltage detection value Vg.i are values averaged by the averaging processing unit 34.

In each expression other than expression (1) and relevant to the control shown below, instantaneous values which are not averaged are used for the boost converter current detection value Iin.i and the DC input voltage detection value Vg.i.

That is, the average value of the boost converter current detection value Iin.i and the average value of the DC input voltage detection value Vg.i are used for calculating the input power average value <Pin.i>.

A notation "< >" indicates an average value or an effective value of a value in the brackets. The same applies hereinafter.

The control processing unit 30 gives the set DC input current target value Ig.i* to the first calculation section 51.

As well as the DC input current target value Ig.i*, the DC input voltage detection value Vg.i and the grid voltage detection value Va are given to the first calculation section 51.

The first calculation section 51 calculates an effective value <Ia*> of an output current target value for the inverter device 1, based on the following expression (2) using the DC input current target value Ig.i*, the DC input voltage detection value Vg.i, and the grid voltage detection value Va which are given thereto.

$$\text{Effective value } <Ia*> \text{ of output current target value} = \Sigma(<Ia.i*>) = \Sigma(<Ig.i* \times Vg.i>/<Va>) \tag{2}$$

Further, the first calculation section 51 calculates an output current target value Ia* based on the following expression (3) (step S2).

Here, the first calculation section 51 calculates the output current target value Ia* as a sine wave having the same phase as the grid voltage detection value Va.

$$\text{Output current target value } Ia* = (2^{1/2}) \times <Ia*> \times \sin \omega t \tag{3}$$

Next, the first calculation section 51 calculates an inverter current target value Iinv* which is a current target value for controlling the inverter circuit 11, as shown by the following expression (4) (step S3).

$$\text{Inverter current target value } Iinv* = Ia* + sCaVa \tag{4}$$

In expression (4), Ca is a capacitance of the capacitor 23, and s is the Laplace operator.

The above expression (4) is represented as follows, using a derivative with respect to time t.

$$Iinv* = Ia* + Ca \times (dVa/dt) \tag{4a}$$

In expressions (4) and (4a), the second term on the right-hand side is a value added in consideration of current flowing through the capacitor 23 of the filter circuit 21.

The output current target value Ia* is calculated as a sine wave having the same phase as the grid voltage detection value Va, as shown by the above expression (3). That is, the control processing unit 30 controls the inverter circuit 11 so that a current phase of the AC power outputted from the inverter device 1 is the same as a phase of the grid voltage (grid voltage detection value Va).

After calculating the inverter current target value Iinv*, the first calculation section 51 gives the inverter current target value Iinv* to the first adder 52.

The inverter circuit 11 is subjected to feedback control based on the inverter current target value Iinv*.

As well as the inverter current target value Iinv*, the present inverter current detection value Iinv is given to the first adder 52.

The first adder 52 calculates a difference between the inverter current target value Iinv* and the present inverter current detection value Iinv, and gives a result of the calculation to the compensator 53.

When the difference is given, the compensator 53 calculates, based on a proportionality coefficient or the like, an inverter voltage reference value Vinv# that allows the difference to converge so that the inverter current detection value Iinv becomes the inverter current target value Iinv*. The compensator 53 gives the inverter voltage reference value Vinv# to the inverter circuit control unit 33, thereby causing the inverter circuit 11 to output a power according to the inverter output voltage target value Vinv*.

The power outputted from the inverter circuit 11, from which the grid voltage detection value Va is subtracted by the second adder 54, is given to the AC reactor 22, and then fed back as a new inverter current detection value Iinv. Then, a difference between the inverter current target value Iinv* and the inverter current detection value Iinv is calculated again by the first adder 52, and the inverter circuit 11 is controlled based on the difference as described above.

As described above, the inverter circuit 11 is subjected to feedback control based on the inverter current target value Iinv* and the inverter current detection value Iinv (step S4).

On the other hand, the inverter current target value Iinv* calculated by the first calculation section 51, as well as the DC input voltage detection value Vg.i and the grid voltage detection value Va, is given to the second calculation section 61.

The second calculation section 61 calculates the inverter output voltage target value Vinv* based on the following expression (5) (step S5).

$$\text{Inverter output voltage target value } Vinv^* = Va + sLaIinv^* \tag{5}$$

In expression (5), La is an inductance of the AC reactor, and s is the Laplace operator.

The above expression (5) is represented as follows, using a derivative with respect to time t.

$$Vinv^* = Va + La \times (dIinv^*/dt) \tag{5a}$$

The second terms on the right-hand side in expressions (5) and (5a) are values added in consideration of a voltage generated between both ends of the AC reactor 22.

In the present embodiment, the inverter output voltage target value Vinv* (voltage target value) is set based on the inverter current target value Iinv* which is the current target value for controlling the inverter circuit 11 so that the current of the AC power outputted from the inverter device 1 has the same phase as the grid voltage detection value Va.

After calculating the inverter output voltage target value Vinv*, the second calculation section 61 compares the DC input voltage detection value Vg with an absolute value of the inverter output voltage target value Vinv* and determines the greater one to be the boost converter voltage target value Vo* as shown by the following expression (6) (step S6).

$$\text{Boost converter voltage target value } Vo^* = \text{Max}(Vg, \text{ absolute value of } Vinv^*) \tag{6}$$

In expression (6), the boost converter voltage target value Vo* is a voltage target value for powers outputted from both boost converters 10 and 41.

For Vg, as shown by the following expression (7), the greatest one of the DC input voltage detection values Vg of the boost converters 10 and 41 is employed.

$$Vg = \text{Max}(Vg.i) \tag{7}$$

Further, the second calculation section 61 calculates a boost converter current target value Iin* based on the following expression (8) (step S7).

$$\text{Boost converter current target value } Iin.i^* = ((Iinv^* \times Vinv^*) + (s\, CoVo^*) \times Vo^*) \times Ig.i^* / \Sigma <Ig.i^* \times Vg.i> \tag{8}$$

In expression (8), Co is a capacitance of the capacitor 19 (smoothing capacitor), and s is the Laplace operator.

The above expression (8) is represented as follows, using a derivative with respect to time t.

$$Iin.i^* = ((Iinv^* \times Vinv^*) + (Co \times dVo^*/dt) \times Vo^*) \times Ig.i^* / \Sigma <Ig.i^* \times Vg.i> \tag{8a}$$

If a current flowing through the capacitor 19 is detected and the detected current is denoted by Ico, the following expression is obtained.

$$Iin.i^* = ((Iinv^* \times Vinv^*) + Ico \times Vo^*) \times Ig.i^* / \Sigma <Ig.i^* \times Vg.i> \tag{8b}$$

In expressions (8), (8a), and (8b), a term added to a product of the inverter current target value Iinv* and the inverter output voltage target value Vinv* is a value added in consideration of a reactive power passing through the capacitor 19. That is, consideration of the reactive power in addition to the power target value for the inverter circuit 11 allows for more accurate calculation of the value of Iin.i*.

Further, if power loss $P_{LOSS}$ of the inverter device 1 is measured in advance, the above expression (8a) can be represented as follows.

$$Iin.i^* = ((Iinv^* \times Vinv^*) + (Co \times dVo^*/dt) \times Vo^* + P_{LOSS}) \times Ig.i^* / \Sigma <Ig.i^* \times Vg.i> \tag{8c}$$

Similarly, the above expression (8b) can be represented as follows.

$$Iin.i^* = ((Iinv^* \times Vinv^*) + Ico \times Vo^* + P_{LOSS}) \times Ig.i^* / \Sigma <Ig.i^* \times Vg.i> \tag{8d}$$

In this case, consideration of the reactive power and the power loss $P_{LOSS}$ in addition to the power target value of the inverter circuit 11 allows for more strict calculation of the value of Iin.i*.

If the capacitance Co and the power loss $P_{LOSS}$ of the capacitor 19 are sufficiently smaller than (Iinv*×Vinv*), the following expression (9) is obtained. Using the expression (9) simplifies calculation processing and shortens calculation time.

$$\text{Boost converter current target value } Iin.i^* = (Iinv^* \times Vinv^*) \times Ig.i^* / \Sigma <Ig.i^* \times Vg.i> \tag{9}$$

The coefficient {Ig.i*/Σ<Ig.i*×Vg.i>} on the right-hand side in expression (9) is a proportional division coefficient for calculating Iin.i*, the proportional division coefficient being obtained by dividing, by the DC input voltage detection value Vg.i, {Ig.i*×Vg.i/Σ<Ig.i*×Vg.i>} which is a ratio of a power value (Ig.i*×Vg.i) of the DC power of each of the boost converters 10 and 41 to Σ<Ig.i*×Vg.i> which is a total power value obtained by summing the DC powers of the boost converters 10 and 41, as shown by the following expression.

$$\{Ig.i^* \times Vg.i/\Sigma <Ig.i^* \times Vg.i>\}/Vg.i = Ig.i^* / \Sigma <Ig.i^* \times Vg.i> \tag{10}$$

The expression (10) may be the following expression (11).

$$<Iin.i>/\Sigma <Iin.i \times Vg.i> \tag{11}$$

The second calculation section 61 calculates the boost converter current target value Iin.i* (boost converter current target values Iin.1* and Iin.2*) as described above. The second calculation section 61 gives the boost converter current target value Iin.1* to the third adder 62.

The first boost converter 10 is subjected to feedback control based on the boost converter current target value Iin.1*.

As well as the boost converter current target value Iin.1*, the present first boost converter current detection value Iin.1 is given to the third adder 62.

The third adder 62 calculates a difference between the boost converter current target value Iin.1* and the present first boost converter current detection value Iin.1, and gives a result of the calculation to the compensator 63.

When the above difference is given, the compensator 63 calculates, based on a proportionality coefficient or the like, a first boost converter voltage reference value Vbc1# that allows the difference to converge so that the first boost converter current detection value Iin.1 becomes the boost converter current target value Iin.1*. The compensator 63 gives the first boost converter voltage reference value Vbc1# to the first boost converter control unit 32, thereby causing the first boost converter 10 to output a power according to the boost converter voltage target value Vo*.

The power outputted from the first boost converter 10, from which the DC input voltage detection value Vg.1 is subtracted by the fourth adder 64, is given to the DC reactor 15, and then fed back as a new first boost converter current detection value Iin.1. Then, a difference between the boost converter current target value Iin.1* and the first boost converter current detection value Iin.1 is calculated again by the third adder 62, and the first boost converter 10 is controlled based on the difference as described above.

As described above, the first boost converter 10 is subjected to feedback control based on the boost converter current target value Iin.1* and the first boost converter current detection value Iin.1 (step S8).

The second calculation section 61 gives the boost converter current target value Iin.2* to the fifth adder 72.

The second boost converter 41 is subjected to feedback control based on the boost converter current target value Iin.2*.

As well as the boost converter current target value Iin.2*, the present second boost converter current detection value Iin.2 is given to the fifth adder 72.

The fifth adder 72 calculates a difference between the boost converter current target value Iin.2* and the present second boost converter current detection value Iin.2, and gives a result of the calculation to the compensator 73.

When the above difference is given, the compensator 73 calculates, based on a proportionality coefficient or the like, a second boost converter voltage reference value Vbc2# that allows the difference to converge so that the second boost converter current detection value Iin.2 becomes the boost converter current target value Iin.2*. The compensator 73 gives the second boost converter voltage reference value Vbc2# to the second boost converter control unit 35, thereby causing the second boost converter 41 to output a power according to the boost converter voltage target value Vo*.

Thus, as in the first boost converter 10, the second boost converter 41 is subjected to feedback control based on the boost converter current target value Iin.2* and the second boost converter current detection value Iin.2 (step S8).

After the above step S8, the control processing unit 30 calculates the present input power average value <Pin.i> based on the above expression (1) (step S9).

Based on comparison with the input power average value <Pin.i> that has been previously calculated, the control processing unit 30 sets the DC input current target value Ig.i* so that the input power average value <Pin.i> becomes a maximum value (follows the maximum power point).

Thus, the control processing unit 30 controls both boost converters 10 and 41 and the inverter circuit 11 while performing MPPT control for the first array 2 and the second array.

Figure 8:
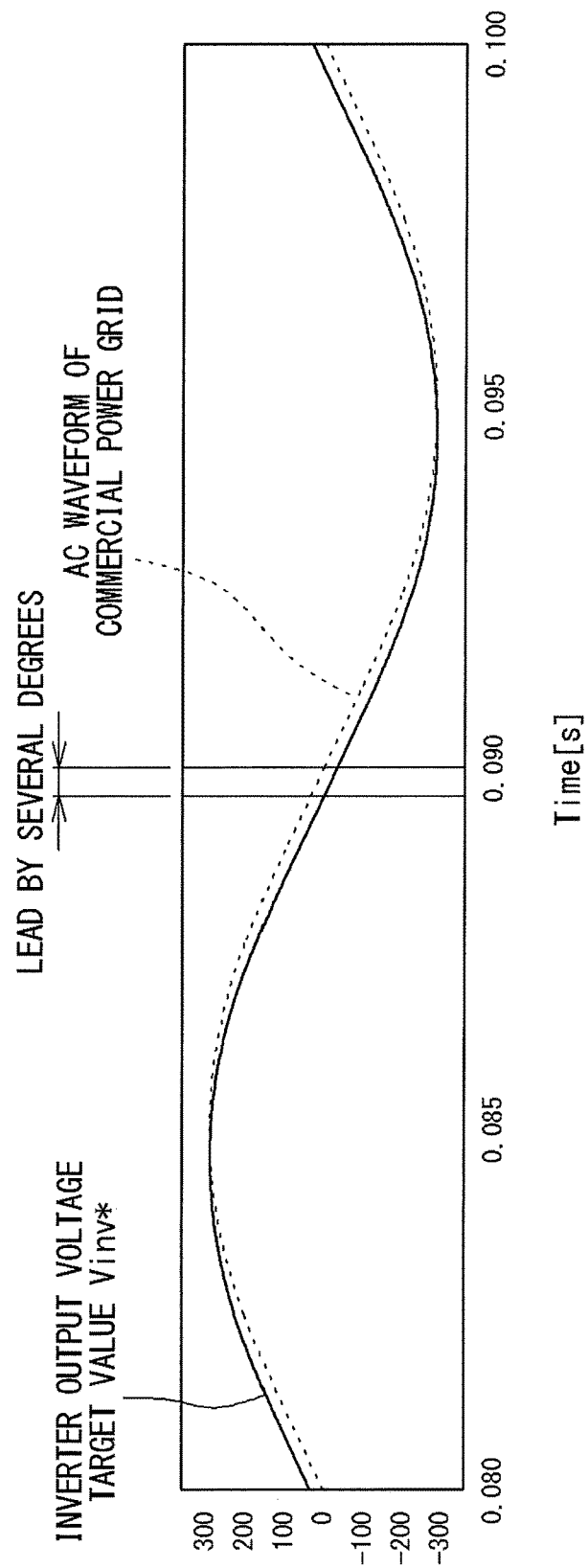
FIG. 8 is a diagram showing an example of an inverter output voltage target value Vinv* (vertical axis: [V]).

FIG. 8 is a diagram showing an example of the inverter output voltage target value Vinv*. In FIG. 8, the vertical axis indicates voltage and the horizontal axis indicates time. A broken line indicates a voltage waveform of the commercial power grid 3, and a solid line indicates a waveform of the inverter output voltage target value Vinv*.

The inverter device 1 outputs a power, using the inverter output voltage target value Vinv* shown in FIG. 8 as a voltage target value, through the control according to the flowchart in FIG. 7.

Therefore, the inverter device 1 outputs a power having a voltage according to the waveform of the inverter output voltage target value Vinv* shown in FIG. 8.

As shown in FIG. 8, the two waveforms have almost the same voltage value and the same frequency, but the phase of the inverter output voltage target value Vinv* leads the phase of the voltage of the commercial power grid 3 by several degrees.

The control processing unit 30 of the present embodiment causes the phase of the inverter output voltage target value Vinv* to lead the phase of the voltage of the commercial power grid 3 by about three degrees while executing the feedback control for the boost converter 10 and the inverter circuit 11, as described above.

The degree of angle by which the phase of the inverter output voltage target value Vinv* is caused to lead the phase of the voltage of the commercial power grid 3 may be several degrees, and as described later, the degree of angle is set within such a range that the phase of a voltage waveform of a difference from a voltage waveform of the commercial power grid 3 leads the phase of the voltage waveform of the commercial power grid 3 by 90 degrees. For example, the degree of the phase leading angle is set to be greater than 0 degrees and smaller than 10 degrees.

<<3 Voltage Target Value for Boost Converter>>

In the present embodiment, as described above, the second array 40 connected to the second boost converter 41 is configured to output a power having a smaller voltage than the voltage of the power outputted from the first array 2.

On the other hand, as shown by the above expressions (6) and (7) and step S6 in FIG. 7, the boost converter voltage target value Vo* which is a voltage target value for powers outputted from both boost converters 10 and 41 is set as follows.

That is, the first DC input voltage detection value Vg.1 of the first array 2 and the second DC input voltage detection value Vg.2 of the second array 40 are compared with each other, and the first DC input voltage detection value Vg.1 which is the higher voltage is selected (expression (7)).

Subsequently, the selected first DC input voltage detection value Vg.1 and an absolute value of the inverter output voltage target value Vinv* are compared with each other, and the higher value is employed, thus obtaining the boost converter voltage target value Vo*.

Figure 9A:
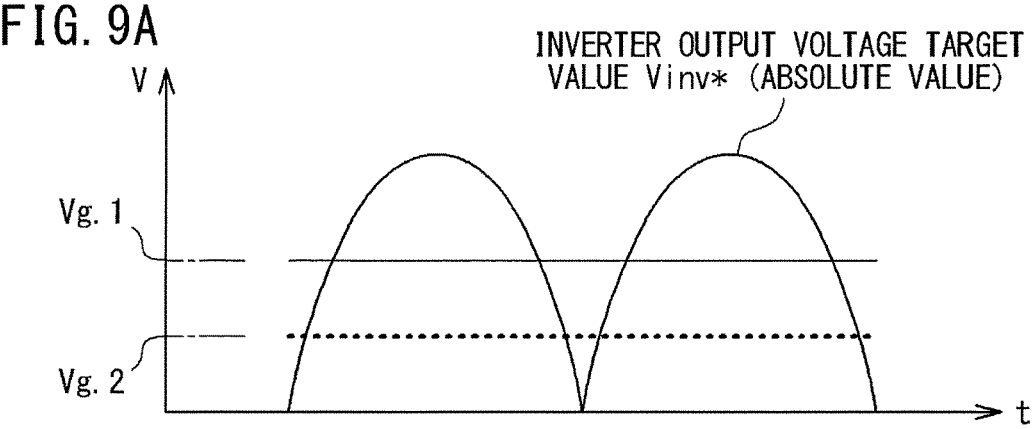
Figure 9B:
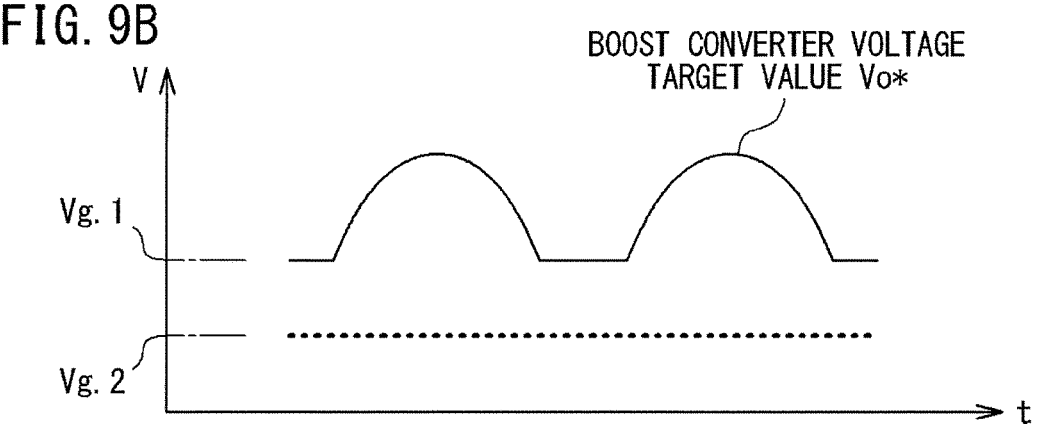
Figure 9C:
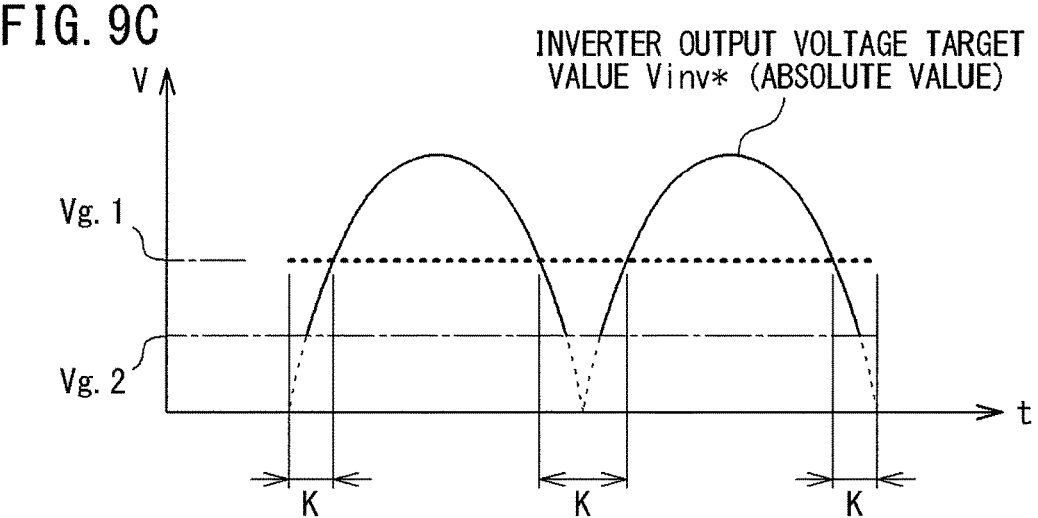

FIG. 9A, FIG. 9B, and FIG. 9C are schematic diagrams showing how to calculate the boost converter voltage target value Vo*. FIG. 9A shows comparison between the inverter output voltage target value Vinv* and the first DC input voltage detection value Vg.1. In the drawing, the vertical axis indicates voltage and the horizontal axis indicates time.

The control processing unit 30 compares the first DC input voltage detection value Vg.1 and the absolute value of the inverter output voltage target value Vinv*, and employs the higher value. Therefore, a waveform of the boost converter voltage target value Vo* follows the inverter output voltage target value Vinv* during a period in which the absolute value of the inverter output voltage target value Vinv* is equal to or greater than the first DC input voltage detection value Vg.1, and follows the first DC input voltage detection value Vg.1 during a period in which the absolute value of the inverter output voltage target value Vinv* is equal to or smaller than the first DC input voltage detection value Vg.1.

FIG. 9B shows a waveform of the boost converter voltage target value Vo*. As shown in FIG. 9B, the waveform of the boost converter voltage target value Vo* follows the absolute value of the inverter output voltage target value Vinv* during a period in which the inverter output voltage target value Vinv* is equal to or greater than the first DC input voltage detection value Vg.1, and follows the first DC input voltage detection value Vg.1 during a period in which the inverter output voltage target value Vinv* is equal to or smaller than the first DC input voltage detection value Vg.1.

Therefore, as shown in FIG. 9B, since the minimum voltage value of the boost converter voltage target value Vo* is the first DC input voltage detection value Vg.1, the boost converter voltage target value Vo* always has a greater voltage than the second DC input voltage detection value Vg.2, and is prevented from becoming lower than the first DC input voltage detection value Vg.1.

That is, the second boost converter 41 always performs step-up operation to output a power having a voltage according to the boost converter voltage target value Vo*.

For example, if a power to be outputted from the second boost converter 41 is stepped up using the second DC input voltage detection value Vg.2 as a reference, the power outputted from the second boost converter 41 has a lower voltage value than the first DC input voltage detection value Vg.1 in a range K in FIG. 9C, and when a power is supplied from only the first array 2, supply of a power from the second array 40 is not obtained. Therefore, power supply efficiency of the arrays 2 and 40 might be reduced as a whole.

In this regard, in the present embodiment, as shown in FIG. 9C, the second boost converter 41 is controlled so that a voltage value of a power to be outputted from the second boost converter 41 substantially coincides with the first DC input voltage detection value Vg.1 in the range K in which the inverter output voltage target value Vinv* is equal to or smaller than the first DC input voltage detection value Vg.1. Therefore, the minimum voltage value of the power outputted from the second boost converter 41 can be made to substantially coincide with the first DC input voltage detection value Vg.1.

Thus, the voltage value of the power outputted from the second boost converter 41 can be prevented from becoming greatly lower than the voltage value of the power outputted from the first boost converter 10. As a result, occurrence of the period K in which supply of a power from the second array 40 through the second boost converter 41 is not obtained can be prevented, whereby reduction in power supply efficiency can be suppressed.

In the present embodiment, in order to calculate the boost converter current target value Iin.i* which is a current target value for each boost converter, as shown by the above expression (8), the power value of the AC power outputted from the inverter circuit 11 is multiplied by a ratio of the power value of each of the boost converters 10 and 41 to a total power value obtained by summing powers of the boost converters 10 and 41, thereby obtaining the boost converter current target value Iin.i*. Therefore, current target values for the respective boost converters 10 and 41 can be obtained appropriately. As a result, the minimum voltage value of the power outputted from the second boost converter 41 substantially coincides with the first DC input voltage detection value Vg.1.

If the first boost converter 10 is controlled based on the boost converter current target value Iin.1*, the first boost converter 10 stops step-up operation during a period in which the inverter output voltage target value Vinv* is lower than the first DC input voltage detection value Vg.1, and performs step-up operation during a period in which the inverter output voltage target value Vinv* is higher than the first DC input voltage detection value Vg.1.

It is noted that a state in which the voltage value (second DC input voltage detection value Vg.2) of the power outputted from the second boost converter 41 substantially coincides with the first DC input voltage detection value Vg.1 means a state in which these voltages coincide with each other to such a degree that, when powers are supplied from the first boost converter 10 and the second boost converter 41, the supply of powers can be obtained from both boost converters.

Figure 10:
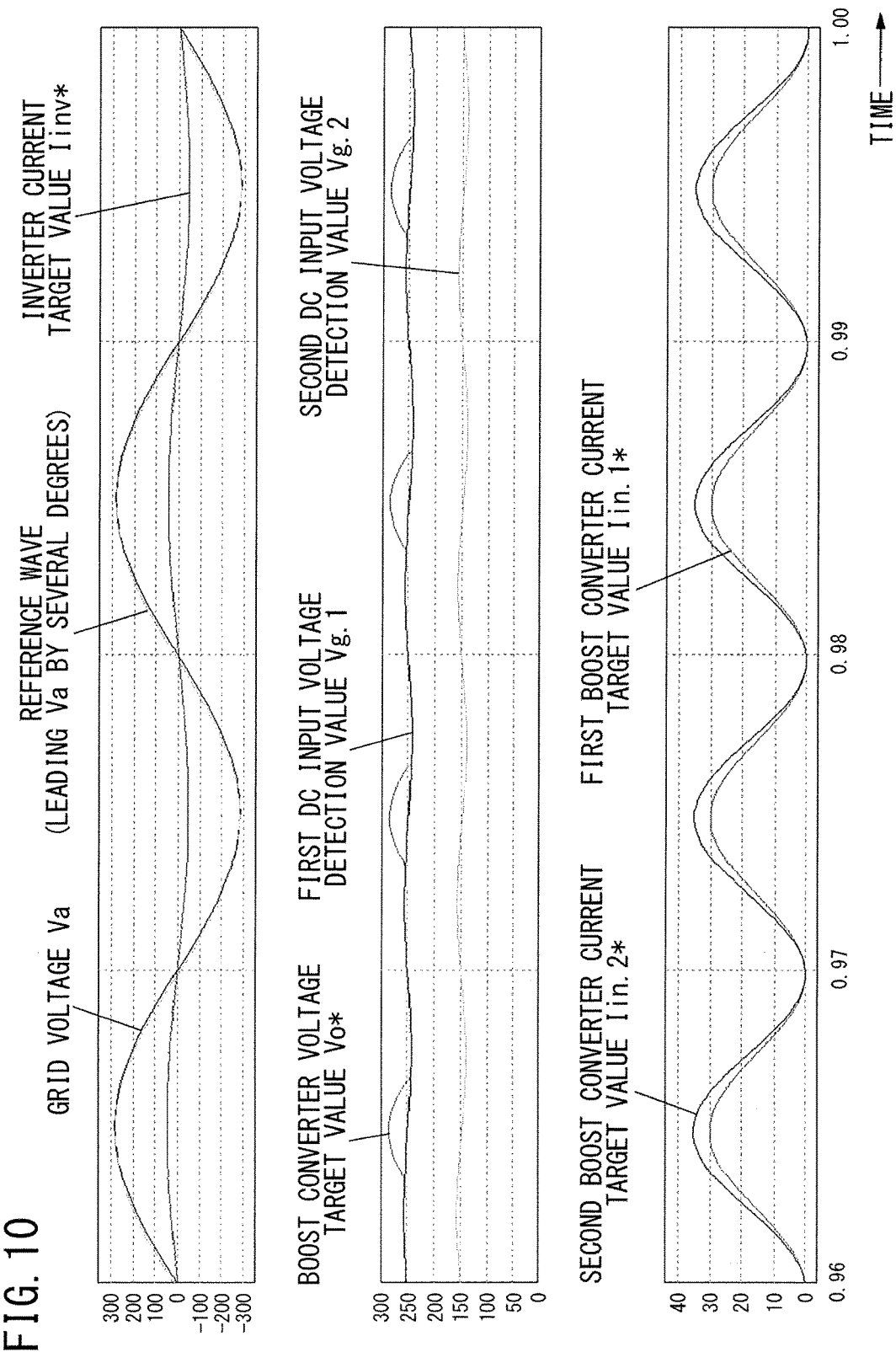
FIG. 10 is graphs showing a simulation result of temporal variations in the DC input voltage detection values Vg.1 and Vg.2 and the boost converter voltage target value Vo*, together with each target value, in which an upper graph shows a relationship between the inverter output voltage target value Vinv* and a system voltage detection value Va, a middle graph shows a relationship between the DC input voltage values Vg.1 and Vg.2 and the boost converter voltage target value Vo*, and a lower graph shows boost converter current target values Iin.1*and Iin.2* (vertical axis for voltage: [V], vertical axis for current: [A]).

FIG. 10 is graphs showing a simulation result of temporal variations in the DC input voltage detection values Vg.1 and Vg.2 and the boost converter voltage target value Vo*, together with each target value.

In FIG. 10, an upper graph shows a relationship between the inverter output voltage target value Vinv* and the grid voltage detection value Va, a middle graph shows a relationship between the DC input voltage values Vg.1 and Vg.2 and the boost converter voltage target value Vo*, and a lower graph shows the boost converter current target values Iin.1* and Iin.2*.

As shown in FIG. 10, it can be confirmed that a waveform of the boost converter voltage target value Vo* follows the absolute value of the inverter output voltage target value Vinv* during a period in which the inverter output voltage target value Vinv* is equal to or greater than the first DC input voltage detection value Vg.1, and follows the first DC input voltage detection value Vg.1 during a period in which the inverter output voltage target value Vinv* is equal to or smaller than the first DC input voltage detection value Vg.1.

<<4 Control for First Boost Converter and Inverter Circuit>>

The first boost converter control unit 32 (FIG. 3) controls the switching element Qb1 of the first boost converter 10. The inverter circuit control unit 33 controls the switching elements Q1 to Q4 of the inverter circuit 11.

The first boost converter control unit 32 and the inverter circuit control unit 33 respectively generate a first boost converter carrier wave and an inverter circuit carrier wave, and respectively modulate these carrier waves with the first boost converter voltage reference value Vbc1# and the inverter voltage reference value Vinv# which are target values given from the control processing unit 30, to generate drive waveforms for driving each switching element.

The first boost converter control unit 32 and the inverter circuit control unit 33 control each switching element based on the drive waveforms, thereby causing the first boost converter 10 and the inverter circuit 11 to output AC powers having voltage waveforms approximate to a waveform of the inverter output voltage target value Vinv*.

Figure 11:
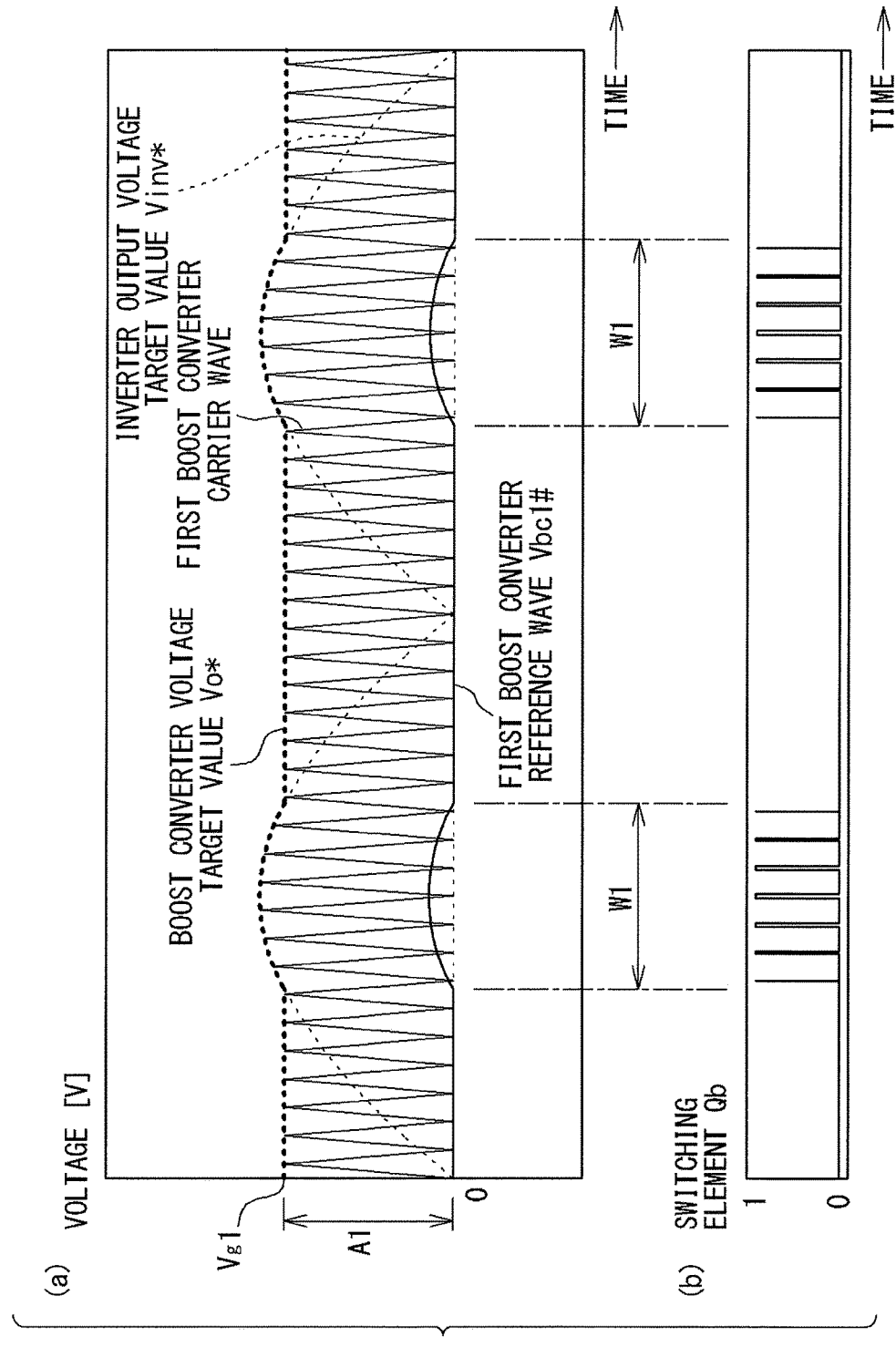
FIG. 11 is graphs in which (a) shows comparison between a first boost converter carrier wave and a waveform of a first boost converter voltage reference value Vbc1#, and (b) shows a drive waveform for driving a switching element, generated by a first boost converter control unit.

In FIG. 11, (a) is a graph showing comparison between the first boost converter carrier wave and a waveform of the first boost converter voltage reference value Vbc1#. In (a) of FIG. 11, the vertical axis indicates voltage and the horizontal axis indicates time. In (a) of FIG. 11, for facilitating the understanding, the wavelength of the first boost converter carrier wave is elongated as compared to the actual wavelength.

The boost converter carrier wave generated by the first boost converter control unit 32 is a triangle wave having a minimum value of "0", and has an amplitude A1 set at the boost converter voltage target value Vo* given from the control processing unit 30.

The frequency of the boost converter carrier wave is set by the boost converter control unit 32 in accordance with a control command from the control processing unit 30, so as to realize a predetermined duty ratio.

As described above, the boost converter voltage target value Vo* varies so as to follow an absolute value of the inverter output voltage target value Vinv* during a period W1 in which the absolute value of the inverter output voltage target value Vinv* is generally equal to or greater than the first DC input voltage detection value Vg.1, and follow the first DC input voltage detection value Vg.1 during the other period. Therefore, the amplitude A1 of the first boost converter carrier wave also varies in accordance with the boost converter voltage target value Vo*.

In the present embodiment, the first DC input voltage detection value Vg.1 is 250 volts, and the amplitude of the voltage of the commercial power grid 3 is 288 volts.

A waveform (hereinafter, may be referred to as a first boost converter reference wave Vbc1#) of the first boost converter voltage reference value Vbc1# corresponds to a value calculated based on the boost converter current target value Iin.1* by the control processing unit 30, and has a positive value during the period W1 in which the absolute value of the inverter output voltage target value Vinv* is greater than the first DC input voltage detection value Vg.1. During the period W1, the first boost converter reference wave Vbc1# has a waveform approximate to the shape of a waveform created by the boost converter voltage target value Vo*, and crosses the first boost converter carrier wave.

The first boost converter control unit 32 compares the first boost converter carrier wave with the first boost converter reference wave Vbc1#, and generates a drive waveform for driving the switching element Qb1 so as to be turned on during a period in which the first boost converter reference wave Vbc1# which is a target value for the voltage between both ends of the DC reactor 15 is equal to or greater than the first boost converter carrier wave, and to be turned off during a period in which the first boost converter reference wave Vbc1# is equal to or smaller than the carrier wave.

In FIG. 11, (b) shows the drive waveform for driving the switching element Qb1, generated by the first boost converter control unit 32. In (b) of FIG. 11, the vertical axis indicates voltage and the horizontal axis indicates time. The horizontal axis in (b) of FIG. 11 coincides with that in (a) of FIG. 11.

The drive waveform indicates switching operation of the switching element Qb1. When the drive waveform is given to the switching element Qb1, the switching element Qb1 is caused to perform switching operation in accordance with the drive waveform. The drive waveform forms a control command to turn off the switching element when the voltage is 0 volts and turn on the switching element when the voltage is a plus voltage.

The first boost converter control unit 32 generates the drive waveform so that the switching operation is performed during the range W1 in which the absolute value of the voltage value of the inverter output voltage target value Vinv* is equal to or greater than the first DC input voltage detection value Vg.1. Therefore, in a range in which the absolute value is equal to or smaller than the first DC input voltage detection value Vg.1, the switching element Qb1 is controlled to stop the switching operation.

Each pulse width is determined by an intercept of the first boost converter carrier wave which is a triangle wave. Therefore, the pulse width is greater at a part where voltage is higher.

As described above, the first boost converter control unit 32 modulates the first boost converter carrier wave with the first boost converter reference wave Vbc1#, to generate the drive waveform representing pulse widths for switching. The first boost converter control unit 32 performs PWM control for the switching element Qb1 of the first boost converter 10, based on the generated drive waveform.

In a case where a switching element Qbu that conducts a current in a forward direction of the diode 16 is provided in parallel with the diode 16, a drive waveform inverted from the drive waveform for the switching element Qb is used for the switching element Qbu. In order to prevent the switching element Qb and the switching element Qbu from conducting currents at the same time, a dead time of about 1 microsecond is provided at a part where a drive pulse for the switching element Qbu shifts from OFF to ON.

Figure 12:
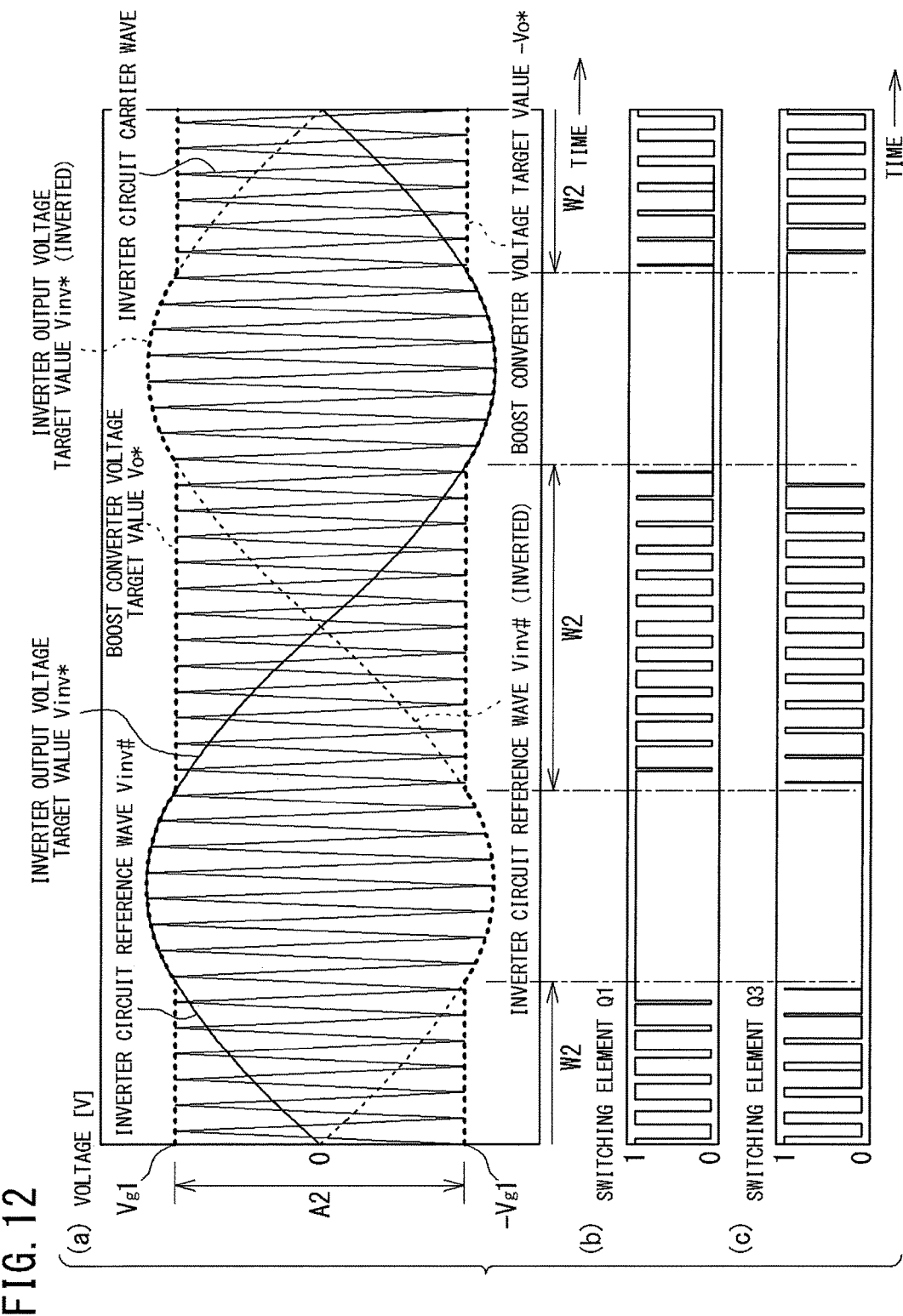
FIG. 12 is graphs in which (a) shows comparison between an inverter circuit carrier wave and a waveform of an inverter voltage reference value Vinv#, (b) shows a drive waveform for driving a switching element Q1, generated by an inverter circuit control unit, and (c) shows a drive waveform for driving a switching element Q3, generated by the inverter circuit control unit.

In FIG. 12, (a) is a graph showing comparison between the inverter circuit carrier wave and a waveform of the inverter voltage reference value Vinv#. In (a) of FIG. 12, the vertical axis indicates voltage and the horizontal axis indicates time. Also in (a) of FIG. 12, for facilitating the understanding, the wavelength of the inverter circuit carrier wave is elongated as compared to the actual wavelength.

The inverter circuit carrier wave generated by the inverter circuit control unit 33 is a triangle wave having an amplitude center at 0 volts, and a one-side amplitude thereof is set at the boost converter voltage target value Vo* (a voltage target value for the capacitor 23). Therefore, the inverter circuit carrier wave has a period in which an amplitude A2 thereof is twice (500 volts) as great as the first DC input voltage detection value Vg.1 and a period in which the amplitude A2 is twice (576 volts at maximum) as great as the voltage of the commercial power grid 3.

The frequency thereof is set by the inverter circuit control unit 33 in accordance with a control command from the control processing unit 30, or the like, so as to realize a predetermined duty ratio.

As described above, the boost converter voltage target value Vo* varies to follow an absolute value of the inverter output voltage target value Vinv* during the period W1 in which the absolute value of the inverter output voltage target value Vinv* is generally equal to or greater than the first DC input voltage detection value Vg.1, and follow the first DC input voltage detection value Vg.1 during the other period, i.e., a period W2. Therefore, the amplitude A2 of the inverter circuit carrier wave also varies in accordance with the boost converter voltage target value Vo*.

A waveform (hereinafter, may be referred to as an inverter circuit reference wave Vinv#) of the inverter voltage reference value Vinv# corresponds to a value calculated based on the inverter current target value Iinv* by the control processing unit 30, and is set to have generally the same amplitude as the voltage amplitude (288 volts) of the commercial power grid 3. Therefore, the inverter circuit reference wave Vinv# crosses the inverter circuit carrier wave in a range where the voltage value is between −Vg.1 and +Vg.1.

The inverter circuit control unit 33 compares the inverter circuit carrier wave with the inverter circuit reference wave Vinv#, and generates drive waveforms for driving the switching elements Q1 to Q4 so as to be turned on during a period in which the inverter circuit reference wave Vinv# is equal to or greater than the inverter circuit carrier wave, and to be turned off during a period in which the inverter circuit reference wave Vinv# is equal to or smaller than the carrier wave.

In FIG. 12, (b) shows the drive waveform for driving the switching element Q1, generated by the inverter circuit control unit 33. In (b) of FIG. 12, the vertical axis indicates voltage and the horizontal axis indicates time. The horizontal axis in (b) of FIG. 12 coincides with that in (a) of FIG. 12.

The inverter circuit control unit 33 generates the drive waveform so that the switching operation is performed in the range W2 in which the voltage of the inverter circuit reference wave Vinv# is between −Vg.1 and +Vg.1. Therefore, in the other range, the switching element Q1 is controlled to stop the switching operation.

In FIG. 12, (c) shows the drive waveform for driving the switching element Q3, generated by the inverter circuit control unit 33. In (c) of FIG. 12, the vertical axis indicates voltage and the horizontal axis indicates time.

The inverter circuit control unit 33 compares the carrier wave with a waveform indicated by a broken line in (a) of FIG. 12, which is inverted from the inverter circuit reference wave Vinv#, to generate the drive waveform for the switching element Q3.

Also in this case, the inverter circuit control unit 33 generates the drive waveform so that the switching operation is performed in the range W2 in which the voltage of (waveform inverted from) the inverter circuit reference wave Vinv# is between −Vg.1 and +Vg.1. Therefore, in the other range, the switching element Q3 is controlled to stop the switching operation.

The inverter circuit control unit 33 generates, as the drive waveform for the switching element Q2, a waveform inverted from the drive waveform for the switching element Q1, and generates, as the drive waveform for the switching element Q4, a waveform inverted from the drive waveform for the switching element Q3.

As described above, the inverter circuit control unit 33 modulates the inverter circuit carrier wave with the inverter circuit reference wave Vinv#, to generate the drive waveforms representing pulse widths for switching. The inverter circuit control unit 33 performs PWM control for the switching elements Q1 to Q4 of the inverter circuit 11, based on the generated drive waveforms.

The first boost converter control unit 32 of the present embodiment causes the first boost converter 10 to output a power so that a current flowing through the DC reactor 15 coincides with the boost converter current target value Iin.1*. As a result, the first boost converter 10 is caused to perform switching operation during the period W1 (FIG. 11) in which an absolute value of the inverter output voltage target value Vinv* is generally equal to or greater than the first DC input voltage detection value Vg.1. The first boost converter 10 outputs a power having a voltage equal to or greater than the first DC input voltage detection value Vg.1 and approximate to the absolute value of the inverter output voltage target value Vinv*, during the period W1. On the other hand, during the period in which the absolute value of the inverter output voltage target value Vinv* is generally equal to or smaller than the first DC input voltage detection value Vg.1, the boost converter control unit 32 stops the switching operation of the boost converter 10. Therefore, during the period in which the absolute value is equal to or smaller than the first DC input voltage detection value Vg.1, the first boost converter 10 outputs, to the inverter circuit 11, the DC power outputted from the first array 2 without stepping up the voltage thereof.

The inverter circuit control unit 33 of the present embodiment causes the inverter circuit 11 to output a power so that a current flowing through the AC reactor 22 coincides with the inverter current target value Iinv*. As a result, the inverter circuit 11 is caused to perform switching operation during the range W2 (FIG. 12) in which the inverter output voltage target value Vinv* is generally between −Vg.1 and +Vg.1. That is, the inverter circuit 11 is caused to perform switching operation during a period in which the absolute value of the voltage of the inverter output voltage target value Vinv* is equal to or smaller than the first DC input voltage detection value Vg.1.

Therefore, while switching operation of the first boost converter 10 is stopped, the inverter circuit 11 performs switching operation to output an AC voltage approximate to the inverter output voltage target value Vinv*.

On the other hand, in the period other than the period W2 in which the voltage of the inverter output voltage target value Vinv* is generally between −Vg.1 and +Vg.1, the inverter circuit control unit 33 stops the switching operation of the inverter circuit 11. During this period, a power stepped up by the first boost converter 10 is given to the inverter circuit 11. Therefore, the inverter circuit 11 whose switching operation is stopped outputs the power given from the first boost converter 10, without stepping down the voltage thereof.

That is, the inverter device 1 of the present embodiment causes the first boost converter 10 and the inverter circuit 11 to perform switching operations so as to be alternately switched therebetween, and superimposes their respective output powers on each other, thereby outputting AC power having a voltage waveform approximate to the inverter output voltage target value Vinv*.

As described above, in the present embodiment, control is performed so that the first boost converter 10 is operated in a case of outputting a voltage corresponding to the part where the voltage of an AC power to be outputted from the inverter device 1 is higher than the first DC input voltage detection value Vg.1, and the inverter circuit 11 is operated in a case of outputting a voltage corresponding to the part where the voltage of the AC power is lower than the first DC input voltage detection value Vg.1. Therefore, since the inverter circuit 11 does not step down the power that has been stepped up by the first boost converter 10, a potential difference in stepping down of the voltage can be reduced, whereby loss due to switching of the boost converter is reduced and the AC power can be outputted with increased efficiency.

Further, for both the first boost converter 10 and the inverter circuit 11, since the inverter output voltage target value Vinv* is calculated based on the inverter current target value Iinv* set by the control unit 12, occurrence of deviation or distortion between the power of the boost converter and the power of the inverter circuit which are outputted so as to be alternately switched can be suppressed.

The first boost converter control unit 32 of the control processing unit 30 may control the first boost converter 10 so as to operate in a range higher than a voltage value slightly lower than the first DC input voltage detection value Vg.1, and to stop switching operation in a range equal to or smaller than the voltage value slightly lower than the first DC input voltage detection value Vg.1.

In this case, a period in which the power outputted from the first boost converter 10 and the power outputted from the inverter circuit 11 are superimposed on each other is intentionally provided, whereby current waveforms can be smoothly connected at a part where the first boost converter 10 and the inverter circuit 11 are switched to each other.

Here, the voltage value slightly lower than the first DC input voltage detection value Vg.1 means a voltage value set so as to allow for smooth connection between the current waveform outputted from the first boost converter 10 and the current waveform outputted from the inverter circuit 11, that is, a voltage value set to be lower than the first DC input voltage detection value Vg.1 so that output of the first boost converter 10 and output of the inverter circuit 11 are superimposed on each other to a degree required for smooth connection between both current waveforms.

Figure 13:
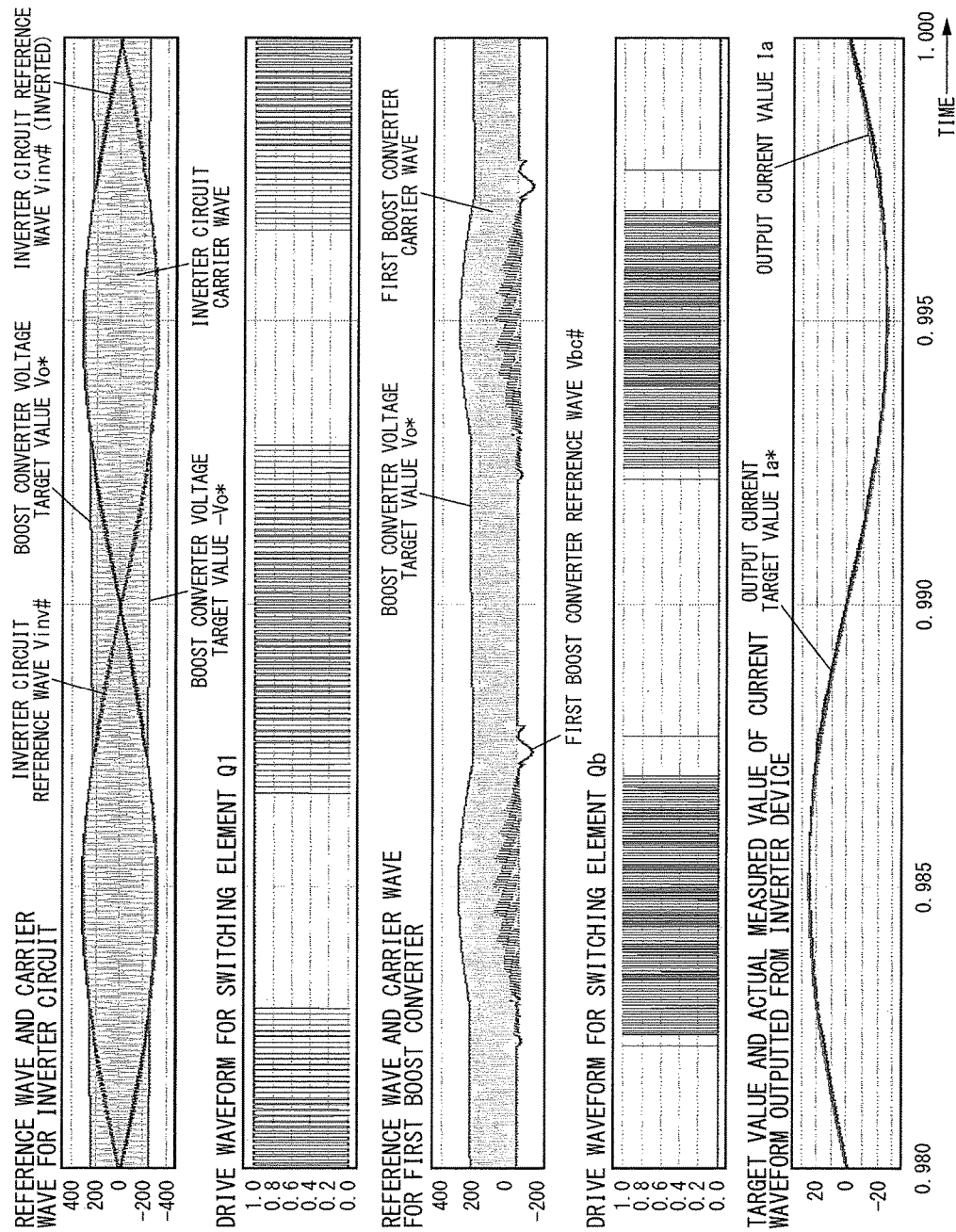
FIG. 13 is a diagram showing examples of reference waves and drive waveforms for switching elements (vertical axis for voltage: [V], vertical axis for current: [A]).

FIG. 13 is a diagram showing examples of reference waves and drive waveforms for the switching elements Qb1 and Q1 to Q4.

FIG. 13 shows graphs of, from the uppermost side, the reference wave Vinv# and the carrier wave for the inverter circuit, the drive waveform for the switching element Q1, the reference wave Vbc1# and the carrier wave for the first boost converter, the drive waveform for the switching element Qb, and the target value and an actual measured value of a current waveform of the AC power outputted from the inverter device 1. The horizontal axes of these graphs indicate time, and coincide with each other.

As shown in FIG. 13, it is found that the output current is controlled so that an actual measured value Ia thereof coincides with a target value Ia*.

In addition, it is found that the period in which the switching element Qb1 of the first boost converter 10 performs switching operation and the period in which the switching elements Q1 to Q4 of the inverter circuit 11 perform switching operations are controlled so as to be alternately switched therebetween.

<<5 Control for Second Boost Converter>>

The second boost converter control unit 35 (FIG. 3) controls the switching element Qb2 of the second boost converter 41.

The second boost converter control unit 35 generates a second boost converter carrier wave, and modulates this carrier wave with the second boost converter voltage reference value Vbc2# given from the control processing unit 30, to generate a drive waveform for driving the switching element Qb2.

The second boost converter control unit 35 and the inverter circuit control unit 33 control each switching element based on the drive waveforms, thereby causing the inverter circuit 11 to output an AC power having a voltage waveform approximate to a waveform of the inverter output voltage target value Vinv*.

Figure 14:
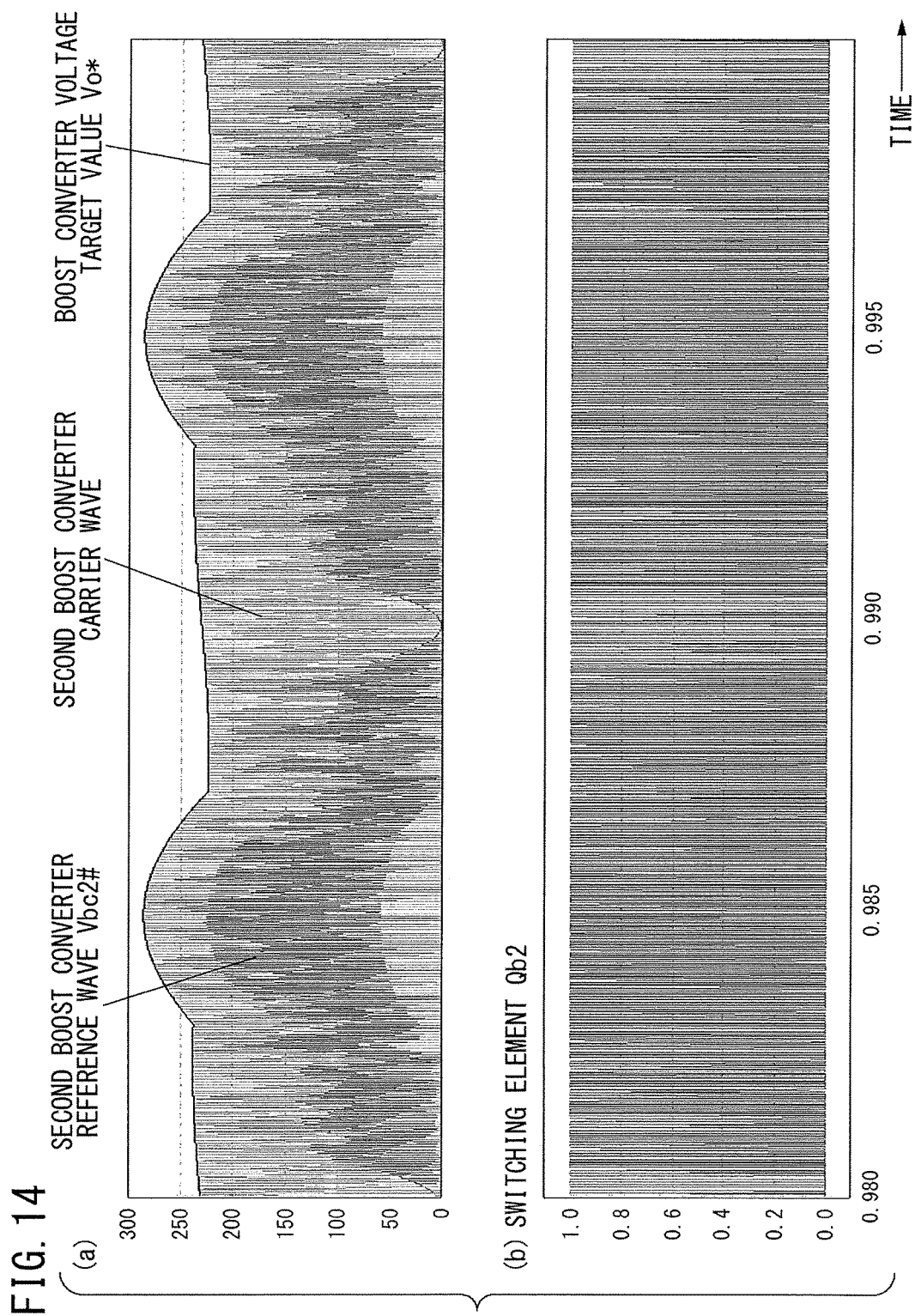
FIG. 14 is graphs in which (a) shows comparison between a second boost converter carrier wave and a waveform of a second boost converter voltage reference value Vbc2# (vertical axis: [V]), and (b) shows a drive waveform for driving a switching element, generated by a second boost converter control unit.

In FIG. 14, (a) is a graph showing comparison between the second boost converter carrier wave and a waveform of the second boost converter voltage reference value Vbc2#. In (a) of FIG. 14, the vertical axis indicates voltage and the horizontal axis indicates time.

The second boost converter carrier wave generated by the second boost converter control unit 35 is a triangle wave and has an amplitude set at the same value (amplitude A1) as the voltage amplitude of the boost converter voltage target value Vo*. The frequency of the second boost converter carrier wave is set by the second boost converter control unit 35 in accordance with a control command from the control processing unit 30, or the like, so as to realize a predetermined duty ratio.

In the present embodiment, the second DC input voltage detection value Vg.2 is 150 volts.

As described above, the boost converter voltage target value Vo* varies so as to follow an absolute value of the inverter output voltage target value Vinv* during a period in which the absolute value of the inverter output voltage target value Vinv* is generally equal to or greater than the first DC input voltage detection value Vg.1, and follow the first DC input voltage detection value Vg.1 during the other period. Therefore, the amplitude of the second boost converter carrier wave also varies in accordance with the boost converter voltage target value Vo*.

A waveform (hereinafter, may be referred to as a second boost converter reference wave Vbc2#) of the second boost converter voltage reference value Vbc2# corresponds to a value calculated based on the boost converter current target value Iin.2* by the control processing unit 30, and has almost a positive value over the entire range, unlike the first boost converter reference wave Vbc1#. Therefore, the second boost converter voltage reference value Vbc2# crosses almost the entire range of the second boost converter carrier wave.

The second boost converter control unit 35 compares the second boost converter carrier wave with the second boost converter voltage reference value Vbc2#, and generates a drive waveform for driving the switching element Qb2 so as to be turned on during a period in which the second boost converter voltage reference wave Vbc2# is equal to or greater than the second boost converter carrier wave, and to be turned off during a period in which the second boost converter reference wave Vbc2# is equal to or smaller than the second boost converter carrier wave.

In FIG. 14, (b) shows the drive waveform for driving the switching element Qb2, generated by the second boost converter control unit 35. In (b) of FIG. 14, the vertical axis indicates voltage and the horizontal axis indicates time. The horizontal axis in (b) of FIG. 14 coincides with that in (a) of FIG. 14.

The second boost converter voltage reference value Vbc2# crosses almost the entire range of the second boost converter carrier wave as described above. Therefore, the second boost converter control unit 35 generates a drive waveform so as to cause the switching element Qb2 to perform switching operation over the entire range.

As described above, the second boost converter control unit 35 modulates the second boost converter carrier wave with the second boost converter voltage reference value Vbc2#, to generate the drive waveform representing pulse widths for switching. The second boost converter control unit 35 performs PWM control for the switching element Qb2 of the second boost converter 41, based on the generated drive waveform.

While being controlled based on the above drive waveform, the second boost converter 41 outputs a current waveform approximate to the second boost converter current target value Iin.2*. Thus, the minimum voltage value of the power outputted from the second boost converter 41 substantially coincides with the first DC input voltage detection value Vg.1 (see in FIG. 9B), whereby the voltage value of the power outputted from the second boost converter 41 can be prevented from becoming greatly lower than the voltage value of the power outputted from the first boost converter 10. As a result, occurrence of the period in which supply of a power from the second array 40 through the second boost converter 41 is not obtained can be prevented, whereby reduction in power supply efficiency can be suppressed.

The voltage of a power given from the second boost converter 41 to the inverter circuit 11 substantially coincides with the voltage of a power given from the first boost converter 10 to the inverter circuit 11 (power stepped up by the first boost converter 10 and DC power outputted from the first array 2). Therefore, the power to be given from the second boost converter 41 to the inverter circuit 11 is superimposed on the power to be given from the first boost converter 10 to the inverter circuit 11, and then the resultant power is given to the inverter circuit 11.

Based on the powers given from both boost converters 10 and 41, the inverter circuit 11 outputs an AC power having a voltage waveform approximate to the inverter output voltage target value Vinv* as described above.

<<6 Current Phase of Outputted AC Power>>

Both boost converters 10 and 41 and the inverter circuit 11 of the present embodiment output an AC power having a voltage waveform approximate to the inverter output voltage target value Vinv*, to the filter circuit 21 connected at the subsequent stage, through the control by the control unit 12.

The inverter device 1 outputs the AC power to the commercial power grid 3 via the filter circuit 21.

Here, the inverter output voltage target value Vinv* is generated by the control processing unit 30 so as to have a voltage phase leading the voltage phase of the commercial power grid 3 by several degrees as described above.

Therefore, AC voltage outputted by both boost converters 10 and 41 and the inverter circuit 11 also has a voltage phase leading the voltage phase of the commercial power grid 3 by several degrees.

As a result, the AC voltage from both boost converters 10 and 41 and the inverter circuit 11 is applied to one end of the AC reactor 22 (FIG. 2) of the filter circuit 21, and the voltage of the commercial power grid 3 is applied to the other end. Thus, voltages having phases shifted from each other by several degrees are applied to the respective ends of the AC reactor 22.

Figure 15:
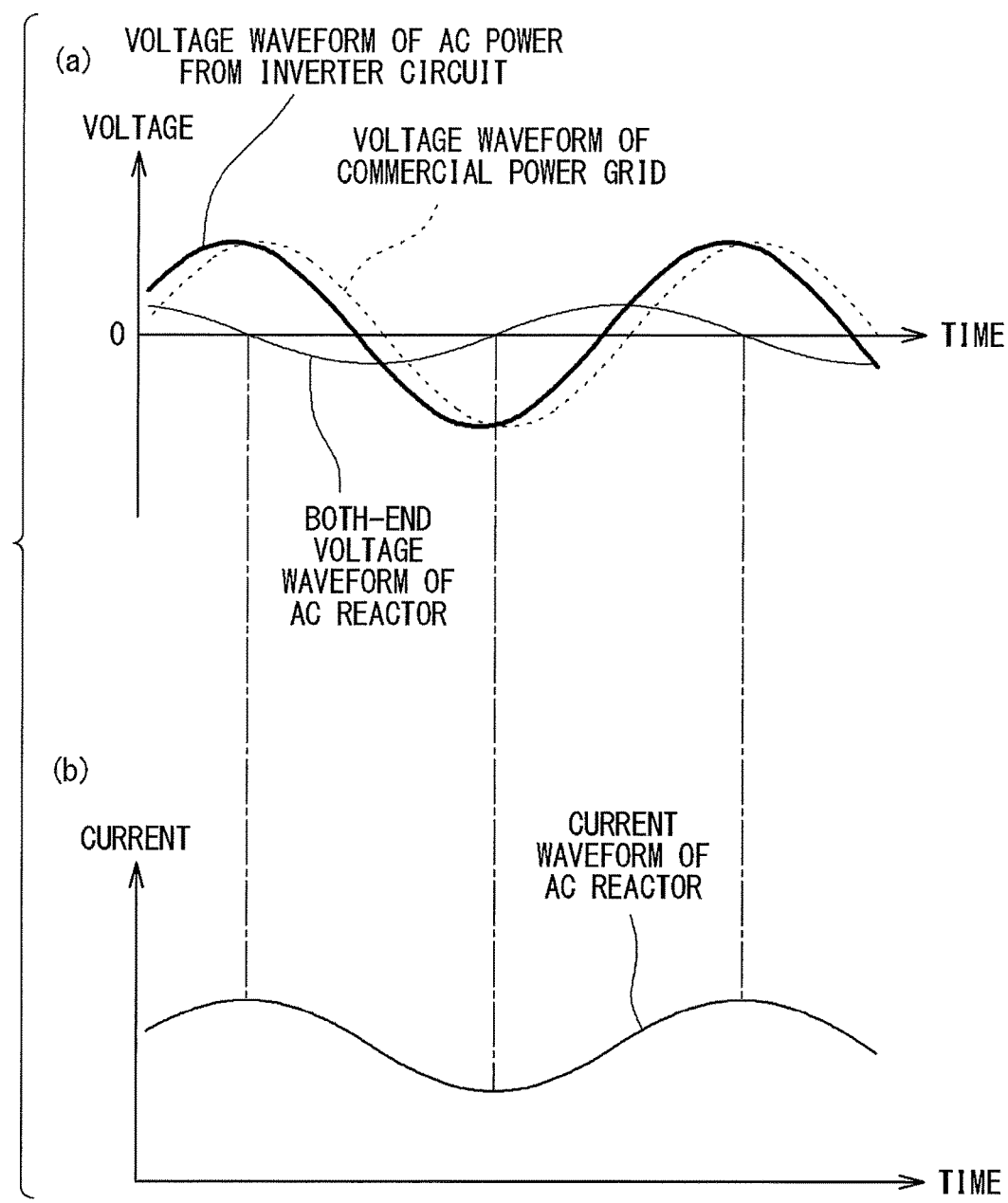
FIG. 15 is graphs in which (a) shows voltage waveforms of an AC voltage outputted from the inverter circuit, a commercial power grid, and the voltage between both ends of an AC reactor, and (b) shows a waveform of a current flowing through the AC reactor.

In FIG. 15, (a) is a graph showing voltage waveforms of the AC voltage outputted from the inverter circuit 11, the commercial power grid 3, and the voltage between both ends of the AC reactor 22. In (a) of FIG. 15, the vertical axis indicates voltage and the horizontal axis indicates time.

As shown in (a) of FIG. 15, when voltages having phases shifted from each other by several degrees are applied to the respective ends of the AC reactor 22, the voltage between both ends of the AC reactor 22 is equal to a difference between the voltages applied to the respective ends of the AC reactor 22 and having phases shifted from each other by several degrees.

Therefore, as shown in (a) of FIG. 15, the phase of the voltage between both ends of the AC reactor 22 leads the phase of the voltage of the commercial power grid 3 by 90 degrees.

In FIG. 15, (b) is a graph showing a waveform of a current flowing through the AC reactor 22. In (b) of FIG. 15, the vertical axis indicates current and the horizontal axis indicates time. The horizontal axis in (b) of FIG. 15 coincides with that in (a) of FIG. 15.

The current phase of the AC reactor 22 lags the voltage phase thereof by 90 degrees. Therefore, as shown in (b) of FIG. 15, the current phase of the AC power outputted through the AC reactor 22 is synchronized with the current phase of the commercial power grid 3.

Therefore, although the phase of the voltage outputted from the inverter circuit 11 leads the phase of the commercial power grid 3 by several degrees, the phase of the current outputted from the inverter circuit 11 coincides with the phase of the current of the commercial power grid 3.

Therefore, the phase of a current waveform of the AC power outputted from the inverter device 1 coincides with the voltage phase of the commercial power grid 3.

As a result, an AC power in phase with the voltage of the commercial power grid 3 can be outputted.

<<7 Others>>

In the above embodiment, an example in which two solar battery arrays, i.e., the first array 2 and the second array 40 are connected in parallel to the inverter circuit 11 has been shown. However, for example, more solar battery arrays may be connected, and more boost converters to which the solar battery arrays are connected may be connected. In this case, among the more solar battery arrays connected, a solar battery array that outputs a power having the highest voltage value can be used as the first array 2 of the above embodiment, and other arrays can be used as the second array 40 of the above embodiment.

Also in this case, a voltage value at an optimum operation point of a solar battery array having the highest voltage value is used as a first input voltage set value Vset1, and other solar battery arrays are controlled so that the minimum voltage value of the power outputted from the other solar battery arrays substantially coincides with the first input voltage set value Vset1.

Also in this case, occurrence of the period in which supply of powers from the multiple solar battery arrays is not obtained can be prevented, whereby reduction in efficiency of the inverter device 1 can be suppressed.

In the above embodiment, the amplitudes of the carrier waves for the inverter circuit, the first boost converter, and the second boost converter are set at the boost converter voltage target value Vo*. However, a voltage sensor for detecting the voltage between both ends of the capacitor 19 may be provided to obtain a boost converter voltage detection value Vo, and the control may be performed using the boost converter voltage detection value Vo.

In this case, the boost converter voltage detection value Vo can be used as the amplitude of each carrier wave. Thus, even when the grid voltage or output voltage of the DC power supply varies, an AC current with reduced distortion can be outputted.

<<8 Control Considering Variations of Overall Configuration>>

<<8.1 Single DC Power Supply>>

The above inverter device 1 has been described as a device that performs power interconnection to the commercial power grid 3 on the basis of outputs from a plurality of solar battery arrays 2, 40. However, a solar battery array only in a single system may be provided. By considering the above expressions with ".i" omitted, the corresponding expressions are obtained for control of the inverter device 1 that performs power interconnection to the commercial power grid 3 on the basis of output of the solar battery array in the single system.

Regarding expression (1), the following expression is obtained.

$$\text{Input power average value } \langle Pin \rangle = \langle Iin \times Vg \rangle \tag{1s}$$

Here, Pin is the input power, Iin is the boost converter current detection value, and Vg is the DC input voltage detection value.

Regarding expression (2), the following expression is obtained.

$$\langle Ia^* \rangle = \langle Ig^* \times Vg \rangle / \langle Va \rangle \tag{2s}$$

Here, Ia* is the output current target value, and Ig* is the DC input current target value.

Expressions (3) to (6) are not changed. Therefore, the same expressions will be shown again as (3s) to (6s) below.

$$\text{Output current target value } Ia^* = (2^{1/2}) \times \langle Ia^* \rangle \times \sin \omega t \tag{3s}$$

$$\text{Inverter current target value } Iinv^* = Ia^* + sCaVa \tag{4s}$$

$$\text{Inverter output voltage target value } Vinv^* = Va + sLaIinv^* \tag{5s}$$

$$\text{Boost converter voltage target value } Vo^* = \text{Max}(Vg, \text{absolute value of } Vinv^*) \tag{6s}$$

It is noted that the number of values of Vg is one and therefore it is not necessary to consider expression (7).

Regarding expression (8), the following expression is obtained.

$$\text{Boost converter current target value } Iin^* = ((Iinv^* \times Vinv^*) + (s\,CoVo^*) \times Vo^*)/Vg \tag{8s}$$

Regarding expression (9), the following expression is obtained.

Boost converter current target value $Iin^*=(Iinv^* \times Vinv^*)/Vg$ (9s)

In the inverter device that performs control represented by the above expressions (1s) to (9s), the boost converter and the inverter circuit each perform high-frequency switching a minimum necessary number of times (minimum switching control). In addition, the inverter circuit operates so as to avoid the peak of the absolute value of the AC voltage and the vicinity thereof, and the boost converter operates so as to avoid the zero cross point of the AC voltage and the vicinity thereof. Therefore, in high-frequency switching, voltages applied to the semiconductor elements and the reactor are relatively reduced. This also contributes to reduction in switching loss in the semiconductor elements and iron loss in the reactor. Thus, the entire loss in the inverter device can be reduced.

In order to achieve the minimum switching control, ideally, it is preferable that the inverter circuit and the boost converter alternately perform high-frequency switching so that their respective periods of high-frequency switching do not overlap each other. However, in practice, even if both periods slightly overlap each other, as long as a stop period is provided for each of the inverter circuit and the boost converter, the loss can be reduced, leading to enhancement in the efficiency.

In addition, as described later, there is a case where the inverter circuit and the boost converter are intentionally caused to perform switching in the same period.

<<8.2 Conversion in Reverse Direction>>

In the above description, power conversion in the "upward direction" from the solar battery arrays (2, 40) as DC power supplies to the commercial power grid 3 has been described. However, storage batteries may be used instead of the solar battery arrays. In this case, it becomes possible to perform both (a) supply of a power from the storage batteries to an AC load in a consumer and (b) charging of the storage battery with a power from the AC grid. In the operation (a), the same control as in the power interconnection is performed. However, reverse flow of power (power selling) is not performed. In the operation (b), the sign in the control is changed, whereby the operation can be efficiently performed through similar control. In charging of the storage battery, the inverter circuit 11 in FIG. 2 operates as a boost converter in cooperation with the AC reactor 22, and on the other hand, the boost converter (e.g., 10) operates as a buck converter. It is noted that, in order to perform step-down operation, it is necessary to use a switching element instead of the diode 16. The switching element is controlled by the control unit 12.

That is, in the inverter device (boost converter, inverter circuit) for which the upward direction is assumed, if a downward direction in which the storage battery is charged is also taken into consideration, it is possible to consider the name of each part to be replaced as follows.

Inverter device (1)→power conversion device (1)
Boost converter (10, 41)→DC/DC converter (10, 41)
Inverter circuit (11)→DC/AC converter (11)

Various values in the control of the power conversion device 1 in the downward direction (charging of storage battery) are as follows.

Ia*: target value for input current from commercial power grid 3
Iin: current detection value of DC/DC converter
Iin*: current target value for DC/DC converter
Iinv*: target value for AC input current to DC/AC converter Ig*: target value for DC input current to storage battery
Va: grid voltage detection value
Vg: storage battery voltage value
Vinv*: target value for AC input voltage to DC/AC converter
Vo*: target value for input voltage to DC/DC converter
Pin: input power to storage battery Therefore, the following relationships corresponding to the above expressions (1s) to (6s), and (8s) can be applied.

The average value <Pin> of the input power Pin to the storage battery, which corresponds to expression (1s), is represented as follows.

$<Pin>=<Iin \times Vg>$ (1r)

The average value <Ia*> of the target value for the input current from the commercial power grid 3, which corresponds to expression (2s), is represented as follows.

$<Ia^*>=<Ig^* \times Vg>/<Va>$ (2r)

The input current target value Ia* corresponding to expression (3s) is represented as follows.

$Ia^*=(2^{1/2}) \times <Ia^*> \times \sin \omega t$ (3r)

The AC input current target value Iinv* corresponding to expression (4s) is represented as follows.

$Iinv^*=Ia^*-sCaVa$ (4r)

The AC input voltage target value Vinv* corresponding to expression (5s) is represented as follows.

$Vinv^*=Va-ZaIinv^*$ (5r)

The voltage target value Vo* for the DC/DC converter 10, which corresponds to expression (6s), is represented as follows.

$Vo^*=\text{Max}(Vg, \text{absolute value of } Vinv^*)$ (6r)

The current target value Iin* corresponding to expression (8s) is represented as follows.

$Iin^*=\{(Iinv^* \times Vinv^*)-(sCoVo^*) \times Vo^*\}/Vg$ (8r)

The current target value Iin* corresponding to expression (9s) is represented as follows.

$Iin^*=(Iinv^* \times Vinv^*)/Vg$ (9r)

<<8.3 Combination of Solar Battery Array and Storage Battery>>

Figure 16:
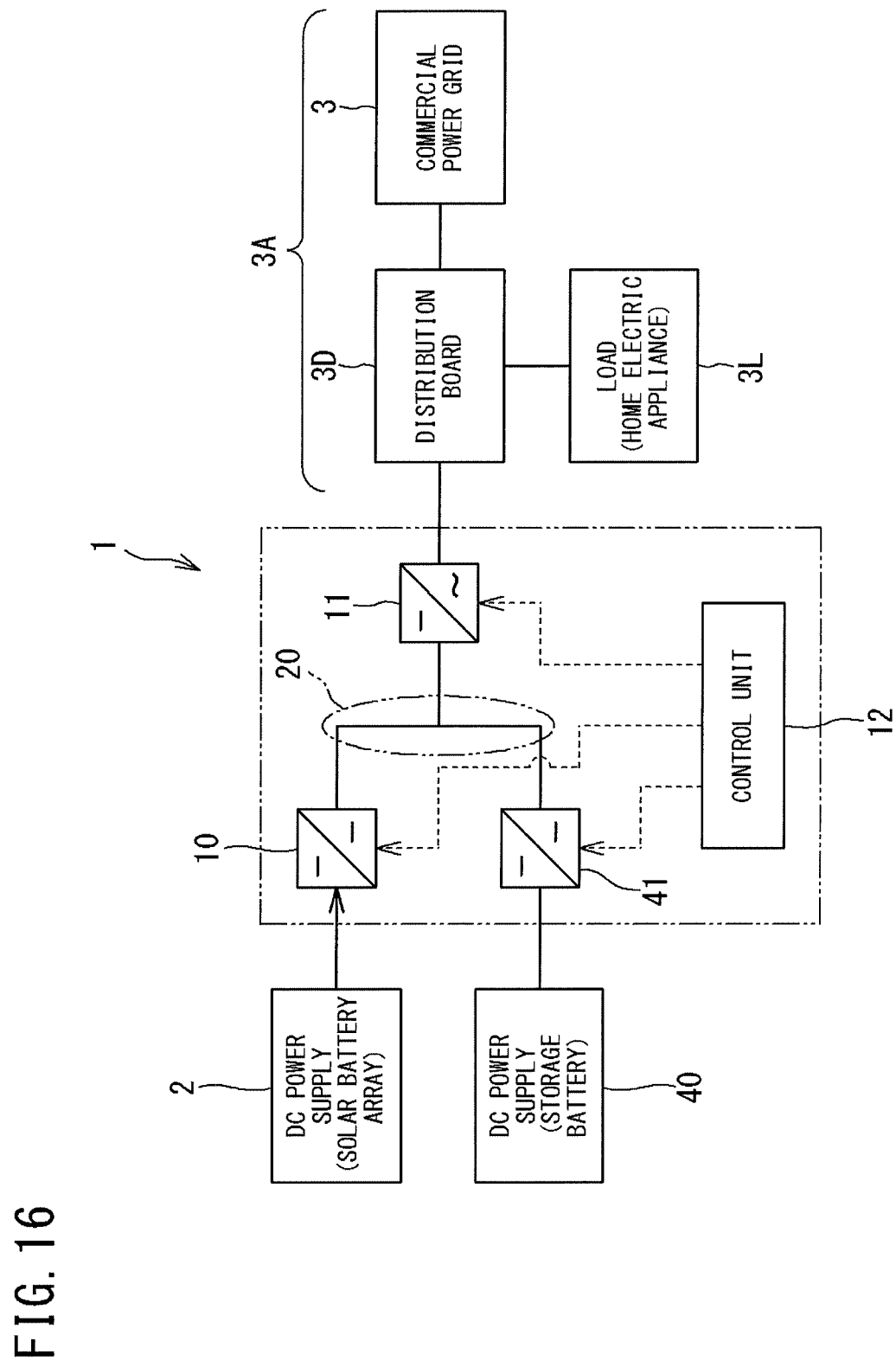
FIG. 16 is a block diagram showing an example of a system in which a power conversion device is provided between an AC grid and two types of DC power supplies.

FIG. 16 is a block diagram showing an example of a system in which the power conversion device 1 is provided between an AC grid 3A and two types of DC power supplies 2, 40. In FIG. 16, the DC power supply 2 is a solar battery array. The DC power supply 40 is a chargeable storage battery. The internal configuration of the power conversion device 1 is almost the same as that of the inverter device 1 in FIG. 2, but is partially different. The AC grid 3A is connected to the commercial power grid 3 via a distribution board 3D in a consumer. A load (home electric appliance, etc.) 3L used in the consumer is connected to the distribution board 3D.

Output from the DC power supply (solar battery array) 2 passes through the power conversion device 1 to undergo power interconnection to the AC grid 3A, thereby supplying a power, and a surplus power that has not been used in the load 3L can be sold. In addition, a power from the AC grid 3A is converted by the power conversion device 1, to charge the DC power supply (storage battery) 40. The DC power supply (storage battery) 40 can be also charged with output from the DC power supply (solar battery array) 2. The DC power supply (storage battery) 40 can supply the stored power to the load 3L.

Figure 17:
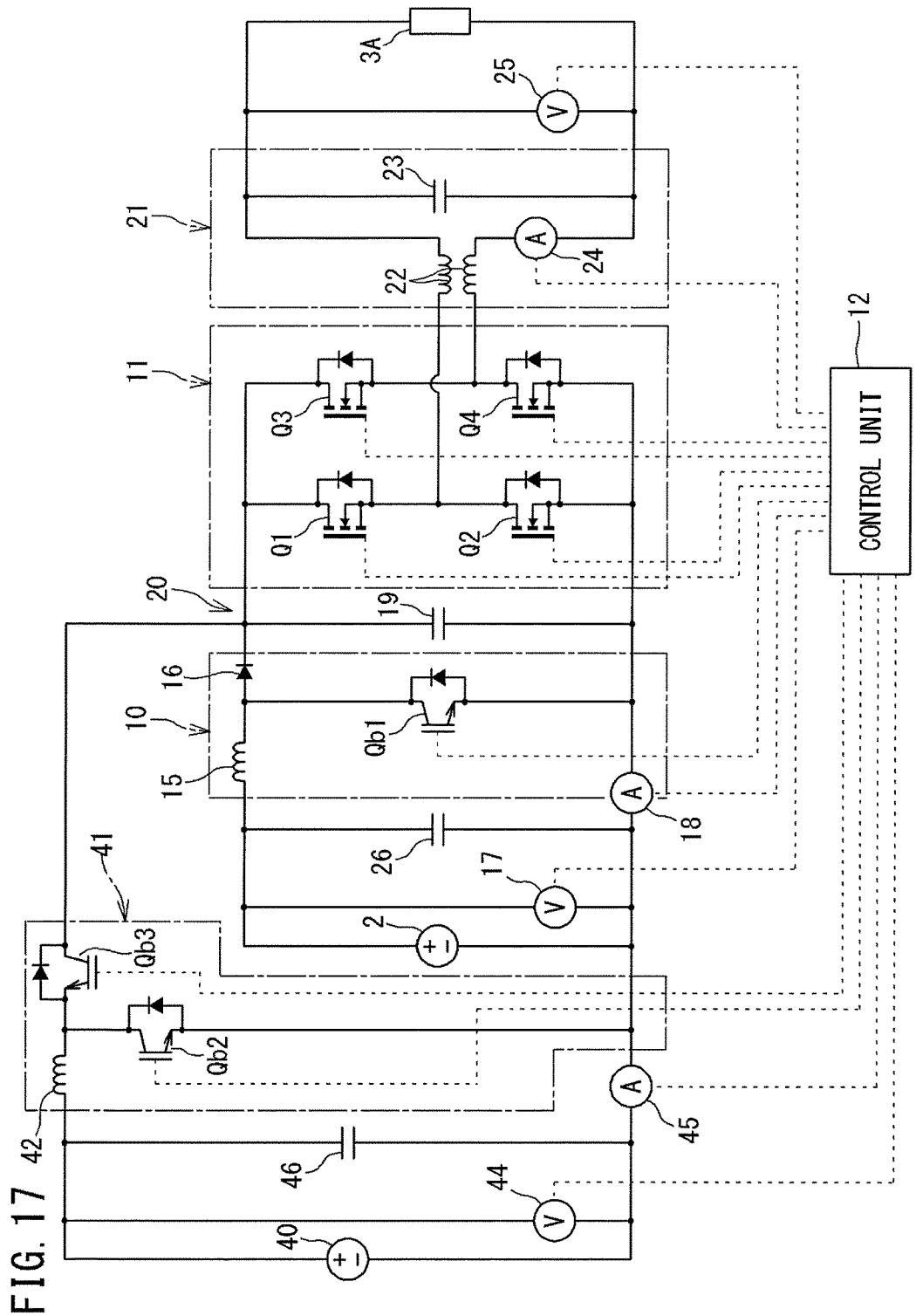
FIG. 17 is an example of a circuit diagram of the power conversion device shown in FIG. 16.

FIG. 17 is an example of a circuit diagram of the power conversion device 1 shown in FIG. 16. A difference from FIG. 2 is that, in the DC/DC converter 41 which can perform not only step-up operation but also step-down operation, a switching element Qb3 is provided instead of the diode 43 (FIG. 2), and the AC side is comprehensively represented as the AC grid 3A. The switching element Qb3 is subjected to chopper control by the control unit 12. The other configuration is the same as in FIG. 2, and therefore the description thereof is omitted.

<<9 Extension of Determination Criterion for Vo*>>

Next, extension of determination criterion for the voltage target value Vo* for the DC/DC converter 10 will be described.

<<9.1 Consideration>>

In order to allow the above minimum switching control to function effectively, the target value Vo* for a voltage to be outputted to the DC bus 20 is set to be lower than the peak value of the absolute value of the AC voltage of the AC grid. Here, according to expression (6) or (6s), Vo* becomes the greater one of the DC input voltage detection value Vg and the absolute value of the voltage target value Vinv* for the DC/AC converter 11. In a range in which the absolute value of the voltage target value Vinv* is comparatively small, the DC input voltage detection value Vg becomes the voltage target value Vo*.

Here, if the AC voltage has a rated voltage of 202V, the voltage that can be actually generated is normally within a range of AC 182 to 222 V prescribed in Electric Utility Industry Law. On the other hand, a DC voltage extracted from the solar battery array has a rated voltage of 250 V, for example, but can greatly vary depending on the condition of photovoltaic generation and the lower-side value thereof can reduce to DC 50 V, for example. Also, the storage battery can have a wide range of values depending on the type or the manufacturer. Influence of such a low DC voltage on the minimum switching control will be considered below.

Figure 18:
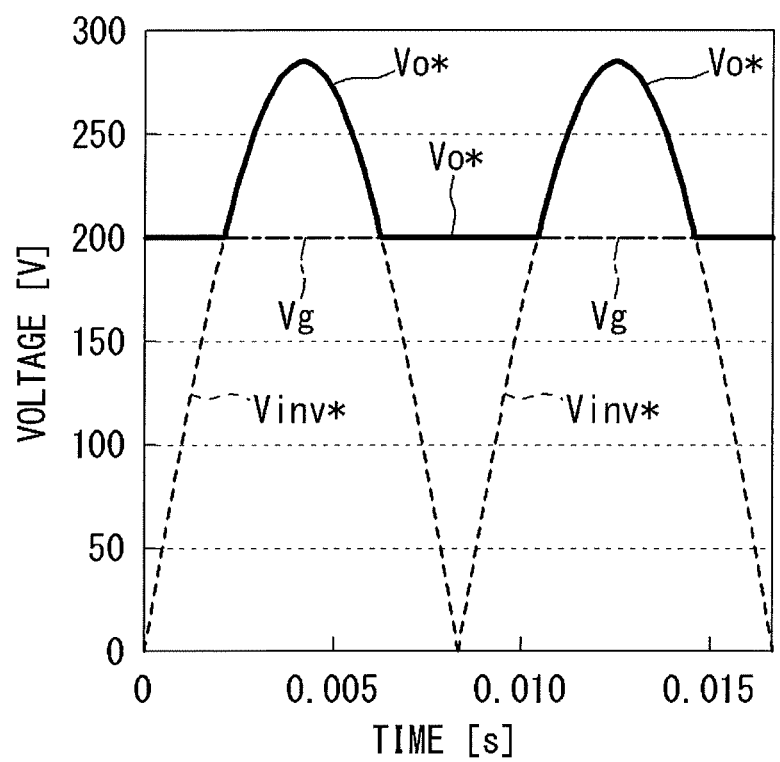
FIG. 18 is an example of a waveform diagram showing the relationship among the absolute value of the voltage target value Vinv* for the AC voltage, a DC input voltage detection value Vg, and the voltage target value Vo*.

FIG. 18 is an example of a waveform diagram showing the relationship among the absolute value of the voltage target value Vinv* for the AC voltage, the DC input voltage detection value Vg, and the voltage target value Vo*.

As a condition, the number n of DC power supplies is two, the DC input voltage detection value Vg, i.e., the value of Max(Vg.i) is 200 V, the effective value of Vinv* is 202 V, and the frequency is 60 Hz (cycle: about 0.0167 seconds). The capacitance Co of the smoothing capacitor 19 is 100 µF.

Figure 19:
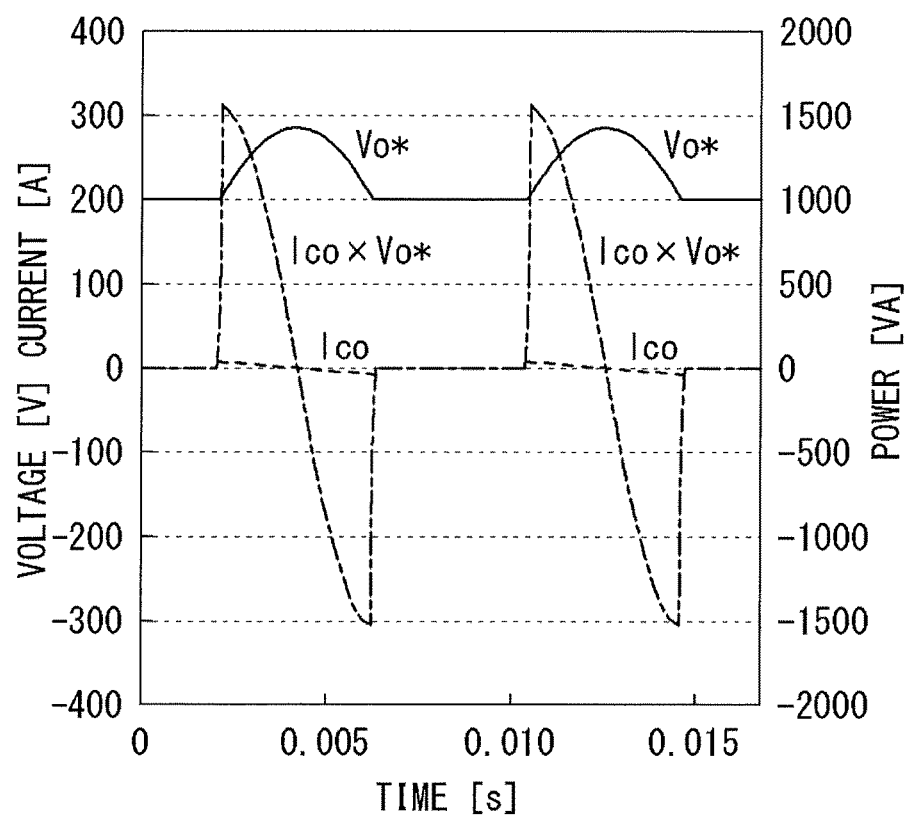
FIG. 19 is a waveform diagram showing the voltage target value Vo* (solid line), and a reactive current Ico (broken line) and a reactive power (Ico×Vo*) (dotted-dashed line) flowing through a capacitor.

FIG. 19 is a waveform diagram showing the voltage target value Vo* (solid line), and a reactive current Ico (broken line) and a reactive power (Ico×Vo*) (dotted-dashed line) flowing through the capacitor 19. The reactive power (Ico× Vo*) can be shared between the two DC/DC converters, and if it is assumed that the reactive power is equally borne therebetween, the DC/DC converter that converts the DC input having the higher voltage needs to bear a current of Ico×Vo*/n/Vg.i. This value is a value obtained by assuming the values of Ig.i as being equal in (Ico×Vo*)×Ig.i*/Σ<Ig.i*× Vg.i> which is a part of the right-hand side of the above expression (8b).

Figure 20:
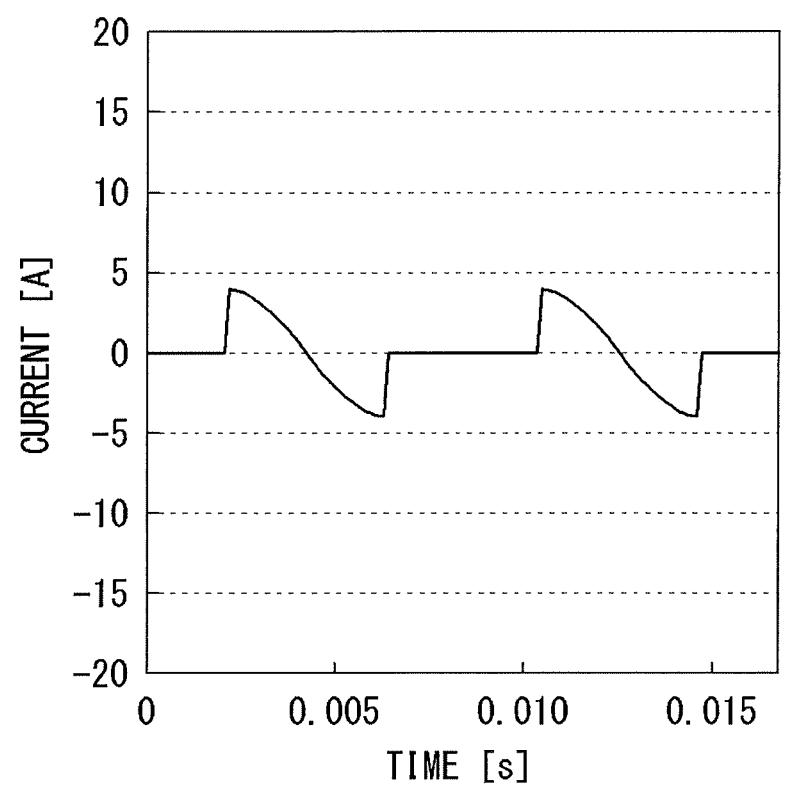
FIG. 20 is a waveform diagram showing a reactive current (Ico×Vo*/n/Vg.i).

FIG. 20 is a waveform diagram showing the reactive current (Ico×Vo*/n/Vg.i).

Figure 21:
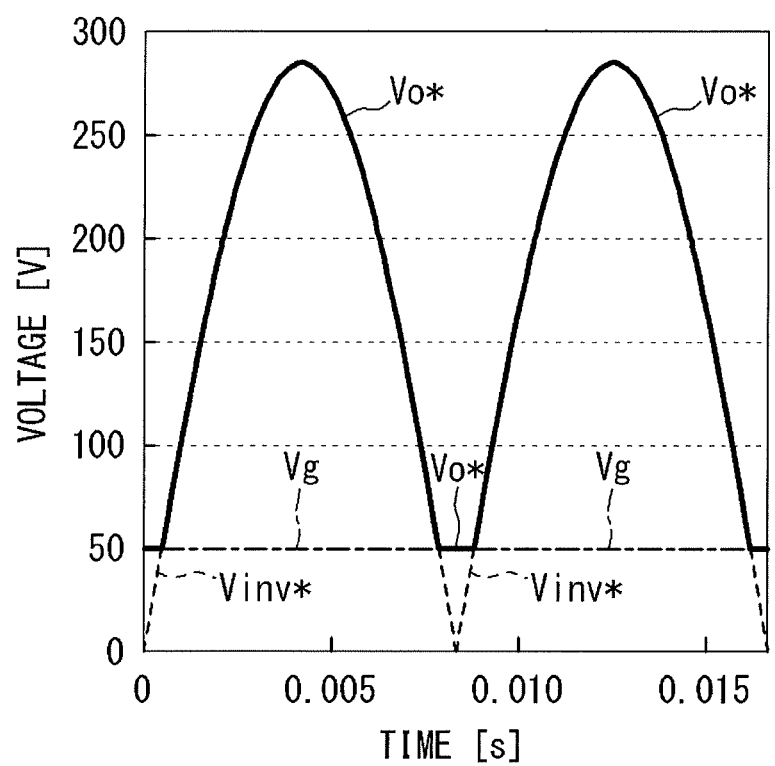
FIG. 21 is another example of waveform diagram showing the relationship among the absolute value of the voltage target value Vinv* for the AC voltage, the DC input voltage detection value Vg, and the voltage target value Vo*.

FIG. 21 is another example of waveform diagram showing the relationship among the absolute value of the voltage target value Vinv* for the AC voltage, the DC input voltage detection value Vg, and the voltage target value Vo*.

As a condition, the number n of DC power supplies is two, the DC input voltage detection value Vg, i.e., the value of Max(Vg.i) is 50 V, the effective value of Vinv* is 202 V, and the frequency is 60 Hz (cycle: about 0.0167 seconds). The capacitance Co of the smoothing capacitor 19 is 100 µF.

Figure 22:
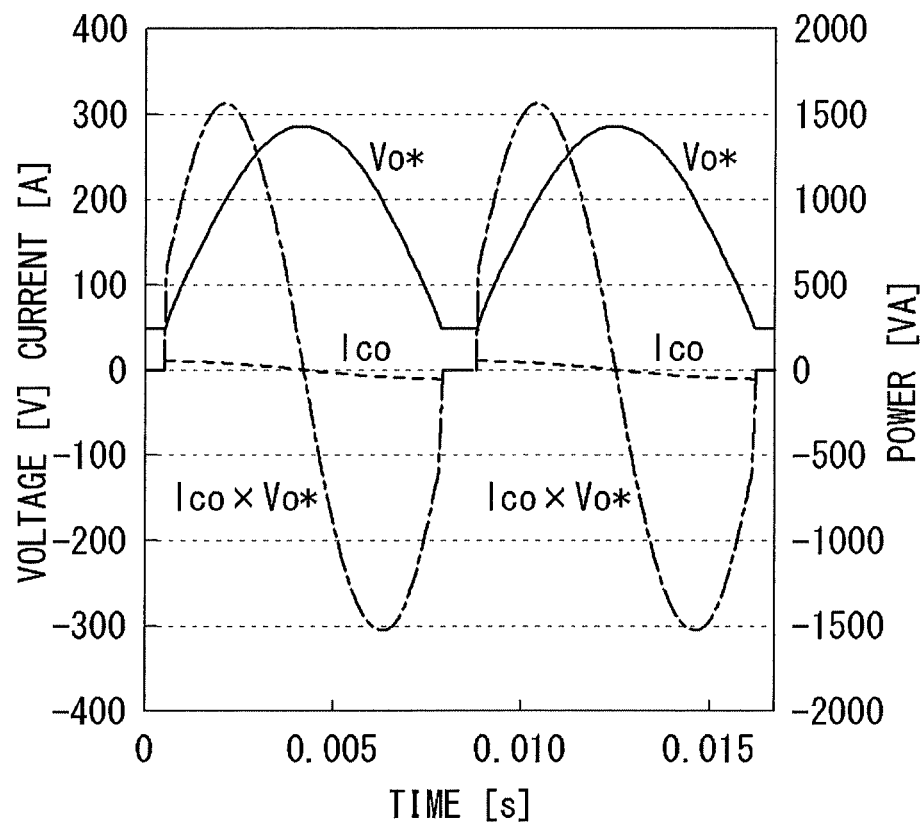
FIG. 22 is a waveform diagram showing the voltage target value Vo* (solid line), and the reactive current Ico (broken line) and the reactive power (Ico×Vo*) (dotted-dashed line) flowing through the capacitor.

FIG. 22 is a waveform diagram showing the voltage target value Vo* (solid line), and the reactive current Ico (broken line) and the reactive power (Ico×Vo*) (dotted-dashed line) flowing through the capacitor 19. The reactive power (Ico× Vo*) can be shared between the two DC/DC converters, and if it is assumed that the reactive power is equally borne therebetween, the DC/DC converter that converts the DC input having the higher voltage needs to bear a current of Ico×Vo*/n/Vg.i.

Figure 23:
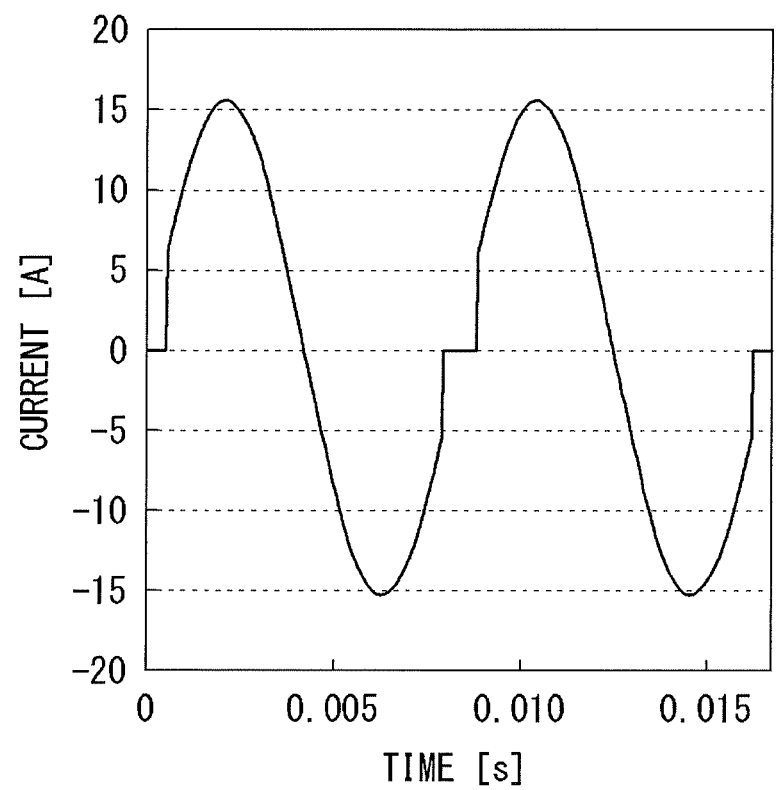
FIG. 23 is a waveform diagram showing a reactive current (Ico×Vo*/n/Vg.i).

FIG. 23 is a waveform diagram showing the reactive current (Ico×Vo*/n/Vg.i).

As is obvious from comparison between FIG. 23 and FIG. 20, in FIG. 23, the current to be borne is great, and the reactive current occupies most part of the period and thus is dominant. Thus, it becomes difficult to perform active-current control which is originally desired to be accurately performed.

<<9.2 Measures>>

Accordingly, the above expressions (6), (6s), (6r) are changed as follows.

That is, the voltage target value Vo* for the DC/DC converter is set as follows.

$$Vo^* = \text{Max}(Vg, \text{absolute value of } Vinv^*, Vo\_\text{limit}) \quad (6x)$$

Vg is Max(Vg.i). For Vo_limit, an appropriate value as the lower limit value (constant value) of the voltage target value is given in advance.

Here, for example, the value of Vo_limit is set at 200 [V].

As a way of determining the value of Vo_limit, it is considered preferable that the period during which the reactive power occurs is equal to or shorter than ¼ cycle (π/2 [rad]) which is half the AC ½ cycle, for example. In this case, it is ensured that the period during which the reactive power is zero is equal to or longer than half the AC (½) cycle. Therefore, the effect of suppressing the reactive power is well exerted.

That is, in a case of voltage of 202 V, such a threshold voltage that the reactive power occurs in a range of ±(π/4) from the peak angle of the sine wave is as follows.

$$(2^{1/2}) \times 202 \times \sin(\pi/4) = 202$$

Therefore, as a value near 202V, 200V is considered to be one of suitable values.

Figure 24:
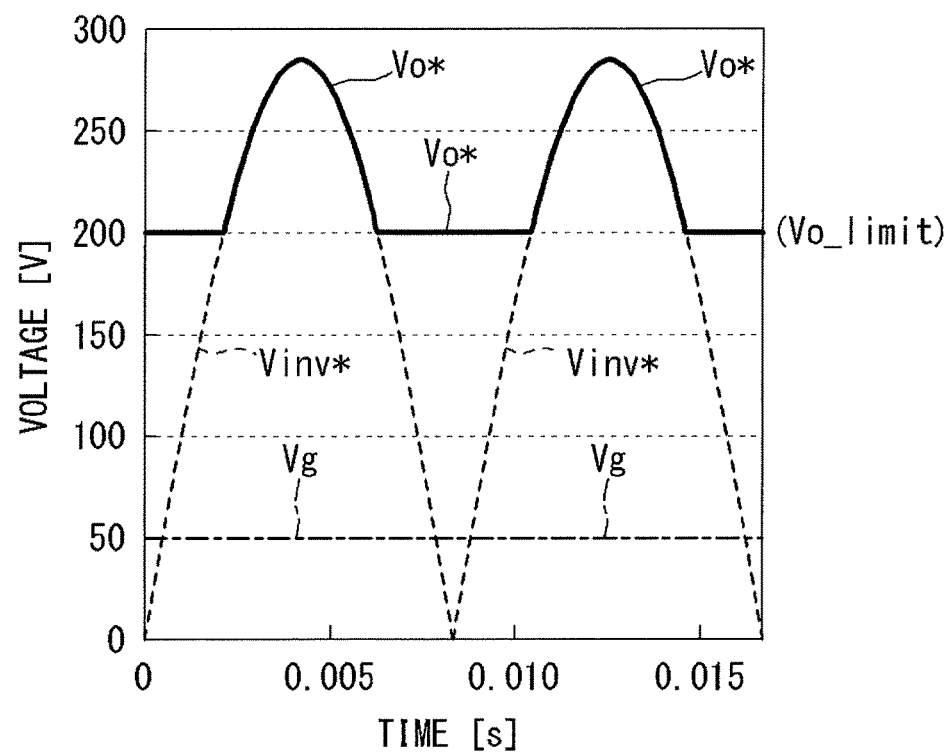
FIG. 24 is an example of a waveform diagram showing the relationship among the absolute value of the voltage target value Vinv* for the AC voltage, the DC input voltage detection value Vg, and the voltage target value Vo*.

FIG. 24 is an example of a waveform diagram showing the relationship among the absolute value of the voltage target value Vinv* for the AC voltage, the DC input voltage detection value Vg, and the voltage target value Vo*. The voltage target value Vo* is determined on the basis of the above expression (6x). Therefore, during the period in which the absolute value of Vinv* is equal to or smaller than Vo_limit, Vo* takes the value of Vo_limit which is the voltage lower limit value, instead of the value of Vg.

Figure 25A:
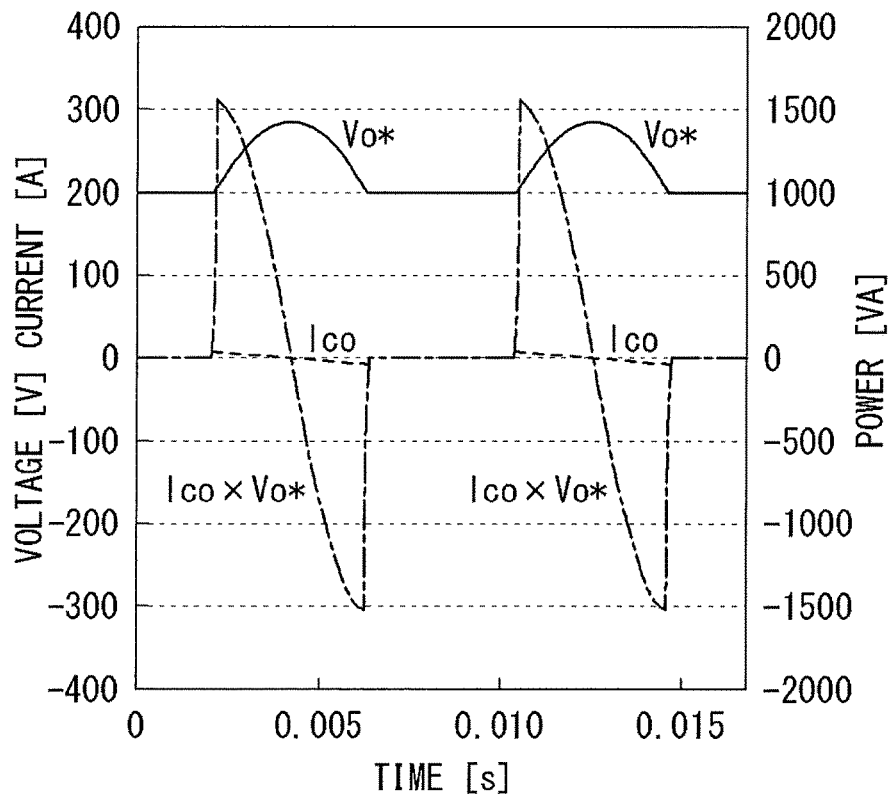
FIG. 25A is a waveform diagram showing the voltage target value Vo* (solid line), and the reactive current Ico (broken line) and the reactive power (Ico×Vo*) (dotted-dashed line) flowing through the capacitor, in a case of employing the voltage target value Vo* shown in FIG. 24.

FIG. 25A is a waveform diagram showing the voltage target value Vo* (solid line), and the reactive current Ico (broken line) and the reactive power (Ico×Vo*) (dotted-dashed line) flowing through the capacitor 19, in a case of employing the voltage target value Vo* shown in FIG. 24.

Figure 25B:
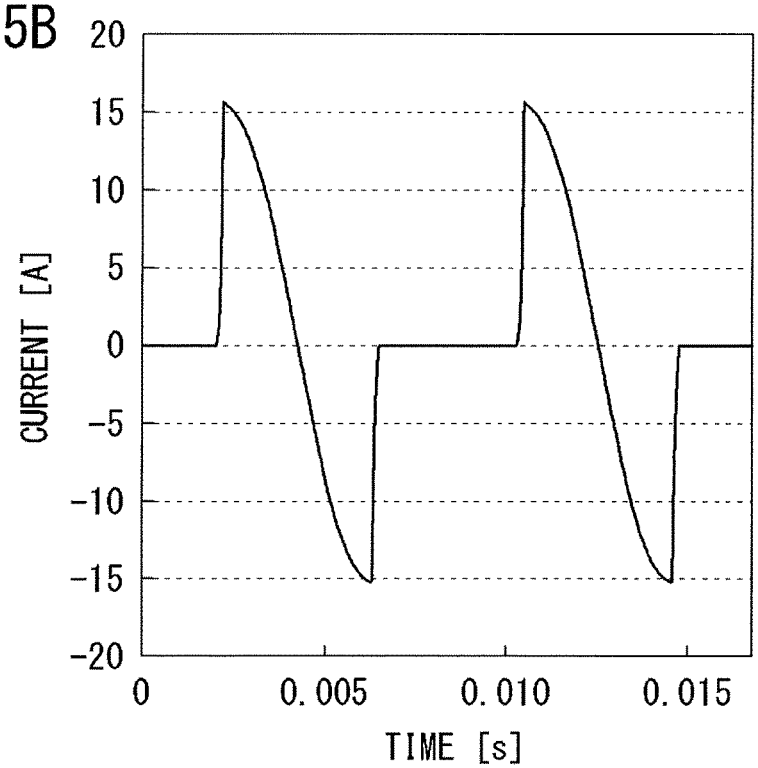
FIG. 25B is a waveform diagram showing the current (Ico×Vo*/n/Vg.i).

FIG. 25B is a waveform diagram showing the current (Ico×Vo*/n/Vg.i). In the waveform diagram in FIG. 25B, the peak value is comparatively high and has no difference from that in FIG. 23. This is because Vg.i of the denominator in the reactive current expression (Ico×Vo*/n/Vg.i) is the same value of 50 V in the case of FIG. 23 and the case of FIG. 25B.

On the other hand, as is obvious from comparison with FIG. 23, in FIG. 25B, the period during which the current becomes zero increases. That is, the period during which the reactive current flows is shortened. Thus, the reactive power due to change in voltage between both ends of the capacitor 19 connected to the DC bus 20 can be reduced. As a result, the active-current control which is originally desired to be performed can be more accurately performed.

Figure 26A:
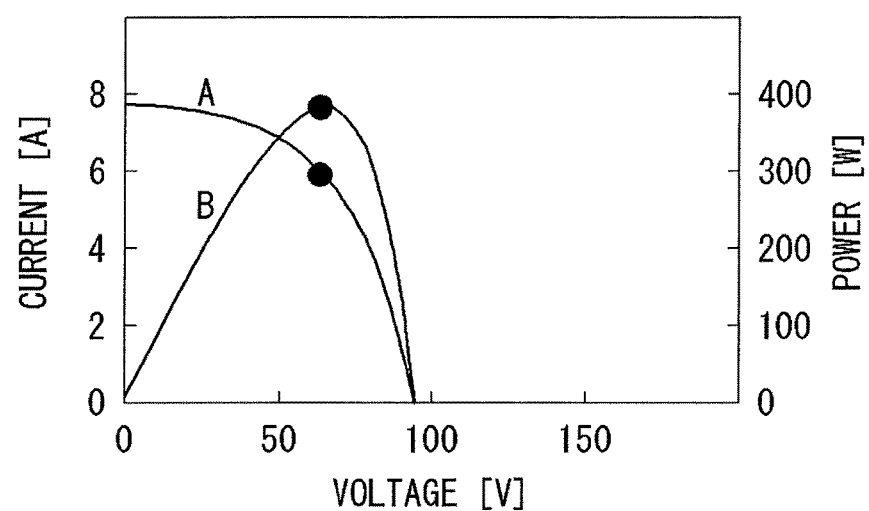
FIG. 26A and FIG. 26B are graphs showing, for comparison purpose, characteristics of MPPT control by a DC/DC converter in a case where a lower limit value is not provided to Vo*.
Figure 26B:
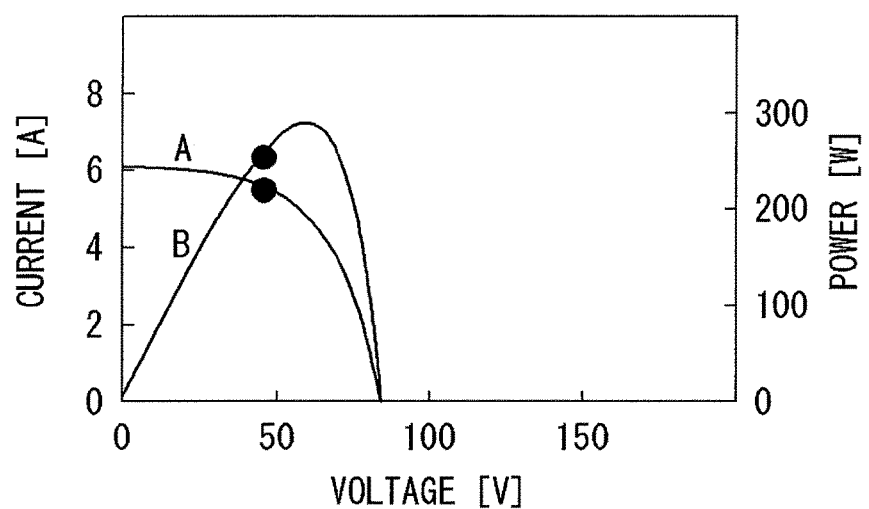

FIG. 26A and FIG. 26B are graphs showing, for comparison purpose, characteristics of MPPT control by the DC/DC converter in a case where a lower limit value is not provided to Vo*. In the graphs, "A" indicates a voltage-current relationship, and "B" indicates a power. FIG. 26A shows a case where the inputted voltage is DC 65 V, and a power point indicated by a filled circle is located at the peak of the power. Thus, MPPT control is achieved. On the other hand, FIG. 26B shows a case where the inputted DC voltage is DC 60 V, and a power point indicated by a filled circle is not located at the peak of the power. Thus, MPPT control is not achieved. This shows an example in which, if a lower limit value is not provided to the voltage target value Vo*, MPPT control cannot be performed when the voltage has reduced to DC 60 V. In a simulation, MPPT efficiency (extracted DC power/power that can be generated) was lower than 90%.

Figure 27A:
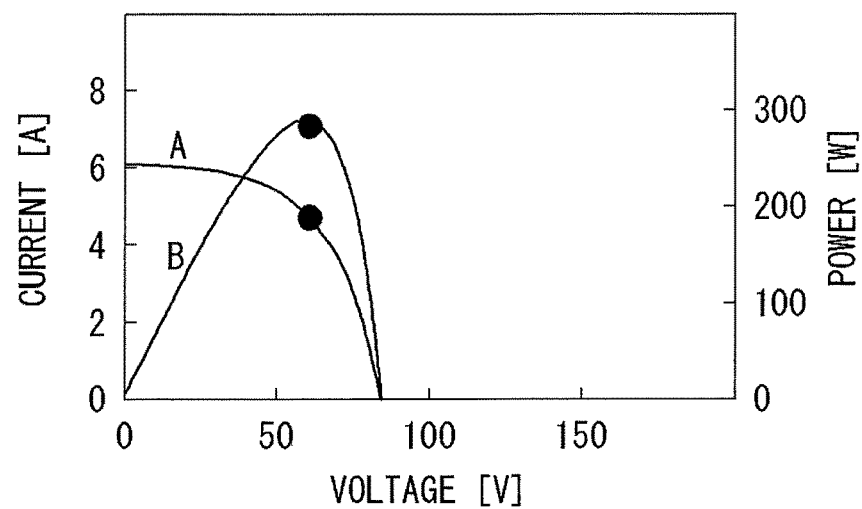
FIG. 27A and FIG. 27B are graphs showing characteristics of MPPT control by the DC/DC converter in a case where a voltage lower limit value Vo_limit is provided to Vo*.
Figure 27B:
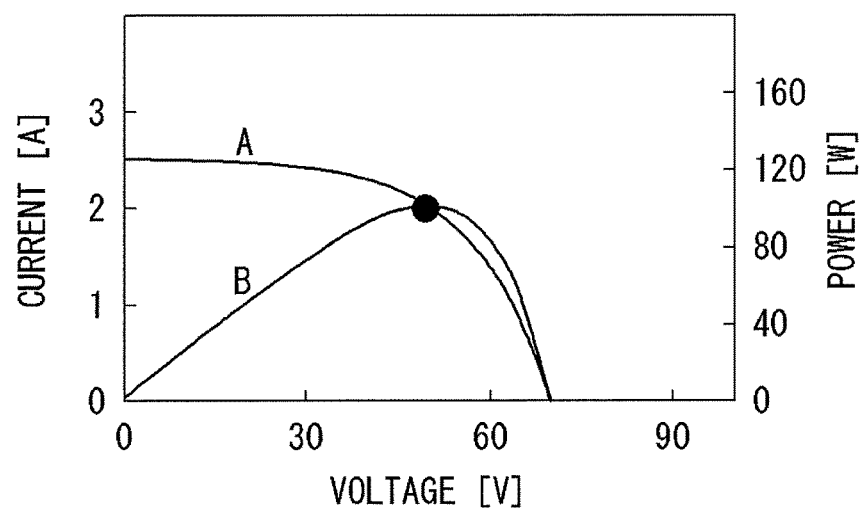

On the other hand, FIG. 27A and FIG. 27B are graphs showing characteristics of MPPT control by the DC/DC converter 10 in a case where the voltage lower limit value Vo_limit is provided to Vo*. In the graphs, "A" indicates a voltage-current relationship, and "B" indicates a power. FIG. 27A shows a case where the inputted voltage is DC 60 V, and a power point indicated by a filled circle is located at the peak of the power. Thus, MPPT control is achieved. Further, FIG. 27B shows a case where the inputted voltage is DC 50 V, and a power point indicated by a filled circle is located at the peak of the power. Thus, MPPT control is achieved. That is, in a case where the lower limit value is provided to the voltage target value Vo*, MPPT control is achieved even if the voltage reduces to DC 60 V, and further, MPPT control is achieved even if the voltage reduces to DC 50 V. The MPPT efficiency reaches 98% or higher.

It is noted that, besides the MPPT control, in the case of storage battery, accuracy of charge/discharge control is improved even if the DC voltage reduces to, for example, about 50 V.

As described above, in a case where the lower limit value is provided to Vo*, it is possible to reduce a reactive power due to change in voltage between both ends of the capacitor connected to the DC bus even if the inputted DC voltage reduces to about 50 V. As a result, the active-current control, such as MPPT control, which is originally desired to be performed can be more accurately performed.

SUMMARY

In the above power conversion device (inverter device), when the DC voltage value (Vg) of the DC power supply is greater than the DC voltage lower limit value (Vo_limit), the greater one of the DC voltage value (Vg) of the DC power supply and the absolute value of the voltage target value (Vinv*) for the AC side of the DC/AC converter is used as the voltage target value (Vo*) for the DC/DC converter at that time. In this case, the DC/DC converter and the DC/AC converter both have switching stop periods in the AC cycle.

On the other hand, when the DC voltage value (Vg) of the DC power supply is smaller than the DC voltage lower limit value (Vo_limit), the greater one of the DC voltage lower limit value (Vo_limit) and the absolute value of the voltage target value (Vinv*) for the AC side of the DC/AC converter is used as the voltage target value (Vo*) for the DC/DC converter at that time. Therefore, the voltage target value (Vo*) for the DC/DC converter has a waveform obtained by selecting the greater one of the DC voltage lower limit value (Vo_limit) and the absolute value of the voltage target value (Vinv*) for the AC side of the DC/AC converter. This means that, when the DC voltage is too low as compared to the peak value of the AC voltage, the DC/DC converter is not stopped but is caused to perform step-up operation to raise the voltage to the DC voltage lower limit value (Vo_limit). Thus, the reactive power due to change in voltage between both ends of the capacitor connected to the DC bus can be reduced. As a result, the active-current control which is originally desired to be performed can be more accurately performed. Therefore, in the power conversion device that basically performs control having a stop period of switching operation, it is possible to suppress reduction in control accuracy even when a DC voltage considerably lower than the effective value of the AC voltage is inputted.

In a case where plural pairs of the DC power supplies and the DC/DC converters are provided, there are a plurality of DC voltage values of the DC power supplies. Accordingly, the greatest value of the plurality of DC voltage values is compared with the DC voltage lower limit value (Vo_limit).

In this case, the reactive power is shared among the plurality of DC/DC converters, whereby the reactive power per DC/DC converter can be reduced.

In addition, as shown in FIG. 25A and FIG. 25B, the DC voltage lower limit value (Vo_limit) is selected so as to shorten the period during which the reactive power occurs, and prolong the period during which the reactive power is zero.

In this case, as described above, even though the peak value of the reactive power cannot be reduced, the reactive power can be reduced owing to the period during which the reactive power is zero, and therefore the active-power control is facilitated.

<<Supplement>>

It is noted that the embodiments disclosed herein are merely illustrative in all aspects and should not be recognized as being restrictive. The scope of the present invention is defined by the scope of the claims, and is intended to include meaning equivalent to the scope of the claims and all modifications within the scope.

REFERENCE SIGNS LIST 1 inverter device, power conversion device
2 first solar battery array, first array
3 commercial power grid
3A AC grid
10 first boost converter, DC/DC converter
11 inverter circuit, DC/AC converter
12 control unit
15 DC reactor
16 diode
17 voltage sensor
18 current sensor
19 capacitor
20 DC bus
21 filter circuit
22 AC reactor 23 capacitor
24 current sensor
25 voltage sensor
26 capacitor
30 control processing unit
32 first boost converter control unit
33 inverter circuit control unit
34 averaging processing unit
35 second boost converter control unit
40 second solar battery array/second array
41 second boost converter, DC/DC converter
42 DC reactor
43 diode
44 voltage sensor
45 current sensor
46 capacitor
51 first calculation section
52 first adder
53 compensator
54 second adder
61 second calculation section
62 third adder
63 compensator
64 fourth adder
72 fifth adder
73 compensator
74 sixth adder
Qb1, Qb2, Qb3 switching element
Q1 to Q4 switching element

The invention claimed is:

1. A power conversion device provided between an AC grid and a DC power supply which outputs a voltage lower than a peak value of an absolute value of an AC voltage of the AC grid, the power conversion device being configured to perform DC/AC power conversion, the power conversion device comprising:
a filter circuit connected to the AC grid;
a DC/DC converter provided between the DC power supply and a DC bus;
a capacitor connected to the DC bus;
a DC/AC converter provided between the DC bus and the filter circuit; and
a control unit configured to control the DC/DC converter and the DC/AC converter, wherein
the control unit
calculates an output current target value on the basis of an input power value of a DC power and a voltage value of the AC grid, and calculates a current target value and a voltage target value for the DC/AC converter on the basis of the output current target value, to control the DC/AC converter, and
calculates a current target value for the DC/DC converter on the basis of the current target value and the voltage target value for the DC/AC converter and a voltage target value for the DC/DC converter, to control the DC/DC converter, thereby controlling output of an AC power, and
the control unit selects, as the voltage target value for the DC/DC converter, a greatest value at a present time, from among a DC voltage value of the DC power supply, an absolute value of a voltage target value for an AC side of the DC/AC converter, and a DC voltage lower limit value which is a predetermined value smaller than a peak value of the absolute value.

2. The power conversion device according to claim 1, wherein
the DC power supply and the DC/DC converter comprise plural pairs of DC power supplies and DC/DC converters, so that there are a plurality of DC voltage values of the DC power supplies, and
a greatest value of the plurality of DC voltage values is to be compared with the DC voltage lower limit value.

3. The power conversion device according to claim 1, wherein
the DC voltage lower limit value is selected so as to shorten a period during which a reactive power occurs, and prolong a period during which the reactive power is zero.

4. The power conversion device according to claim 3, wherein
the DC voltage lower limit value is selected so that the period during which the reactive power occurs becomes equal to or shorter than half an AC (½) cycle.

5. A control method executed by a power conversion device provided between an AC grid and a DC power supply which outputs a voltage lower than a peak value of an absolute value of an AC voltage of the AC grid, the power conversion device including: a filter circuit connected to the AC grid; a DC/DC converter provided between the DC power supply and a DC bus; a capacitor connected to the DC bus; and a DC/AC converter provided between the DC bus and the filter circuit, the power conversion device being configured to perform DC/AC power conversion, the method comprising:
as a basic control method,
calculating an output current target value on the basis of an input power value of a DC power and a voltage value of the AC grid, and calculating a current target value and a voltage target value for the DC/AC converter on the basis of the output current target value, to control the DC/AC converter, and
calculating a current target value for the DC/DC converter on the basis of the current target value and the voltage target value for the DC/AC converter and a voltage target value for the DC/DC converter, to control the DC/DC converter, thereby controlling output of an AC power; and
as an extensional control method,
selecting, as the voltage target value for the DC/DC converter, a greatest value at a present time, from among a DC voltage value of the DC power supply, an absolute value of a voltage target value for an AC side of the DC/AC converter, and a DC voltage lower limit value which is a predetermined value smaller than a peak value of the absolute value.

6. A power conversion device provided between an AC grid and a DC power supply which outputs a voltage lower than a peak value of an absolute value of an AC voltage of the AC grid, the power conversion device being configured to perform DC/AC power conversion, the power conversion device comprising:
a filter circuit connected to the AC grid;
a DC/DC converter provided between the DC power supply and a DC bus;
a capacitor connected to the DC bus;
a DC/AC converter provided between the DC bus and the filter circuit; and
a control unit configured to control the DC/DC converter and the DC/AC converter, wherein
the control unit
calculates an output current target value on the basis of an input power value of a DC power and a voltage value of the AC grid, and calculates a current target value and a voltage target value for the DC/AC converter on the basis of the output current target value, to control the DC/AC converter, and calculates a current target value for the DC/DC converter on the basis of the current target value and the voltage target value for the DC/AC converter and a voltage target value for the DC/DC converter, to control the DC/DC converter, thereby controlling output of an AC power, and the control unit selects, as the voltage target value for the DC/DC converter, a greatest value at a present time, from among a DC voltage value of the DC power supply, an absolute value of a voltage target value for an AC side of the DC/AC converter, and a DC voltage lower limit value which is a predetermined value smaller than a peak value of the absolute value, and the control unit causes a period during which a part of a pulsating current waveform of the absolute value appears, to be equal to or shorter than half of one pulsating current cycle.

7. The power conversion device according to claim 2, wherein the DC voltage lower limit value is selected so as to shorten a period during which a reactive power occurs, and prolong a period during which the reactive power is zero.

8. The power conversion device according to claim 7, wherein the DC voltage lower limit value is selected so that the period during which the reactive power occurs becomes equal to or shorter than half an AC (½) cycle.

* * * * *